US010162650B2

(12) United States Patent
Frank et al.

(10) Patent No.: US 10,162,650 B2
(45) Date of Patent: *Dec. 25, 2018

(54) MAINTAINING DEPLOYMENT PIPELINES FOR A PRODUCTION COMPUTING SERVICE USING LIVE PIPELINE TEMPLATES

(71) Applicant: Amazon Technologies, Inc., Seattle, WA (US)

(72) Inventors: Martin Robert Frank, Bainbridge Island, WA (US); Ian Aird Mosher, Seattle, WA (US); Felix Walter Blue Jodoin, Seattle, WA (US); Mark Sidney James Mansour, Seattle, WA (US); Sixiang Gu, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/607,237

(22) Filed: May 26, 2017

(65) Prior Publication Data

US 2017/0262298 A1    Sep. 14, 2017

Related U.S. Application Data

(63) Continuation of application No. 14/977,115, filed on Dec. 21, 2015, now Pat. No. 9,760,366.

(51) Int. Cl.
*G06F 9/45*    (2006.01)
*G06F 9/445*   (2018.01)
(Continued)

(52) U.S. Cl.
CPC ............ *G06F 9/44536* (2013.01); *G06F 8/65* (2013.01); *G06F 8/71* (2013.01); *G06F 17/3089* (2013.01);
(Continued)

(58) Field of Classification Search
None
See application file for complete search history.

(56) References Cited

U.S. PATENT DOCUMENTS 5,321,610 A  *  6/1994  Breslin .................. G06Q 10/10
                                                    700/100
6,907,546 B1 *  6/2005  Haswell .............. G06F 11/3684
                                                    714/38.11
(Continued)

FOREIGN PATENT DOCUMENTS

WO    2015112170 A1   7/2015
WO    2017095382 A1   6/2017

OTHER PUBLICATIONS

Anonymus: "Automating Applications with Continuous Delivery on AWS Version 1.0", Dec. 31, 2014, retrieved on May 3, 2017, <http://awsinfo.me/training/bootcamps/AutomatingApp-with-ContinuousDelivery-on-AWS_SG.pdf> 66 pages.
(Continued)

*Primary Examiner* — Matthew J Brophy
(74) *Attorney, Agent, or Firm* — Patterson + Sheridan, LLP

(57) ABSTRACT

Techniques are presented for managing a deployment pipeline using an inheritable and extensible source code template—generally referred to as a live pipeline template (LPT). As described, live pipeline templates may be used to manage deployment pipelines which, in turn, are used to launch, maintain, and update the services and systems used to host and provide computing services.

20 Claims, 18 Drawing Sheets

(51) Int. Cl.
*G06F 8/65* (2018.01)
*H04L 29/08* (2006.01)
*G06F 8/71* (2018.01)
*G06F 17/30* (2006.01)

(52) U.S. Cl.
CPC ........ *G06F 17/30141* (2013.01); *H04L 67/34* (2013.01)

(56) References Cited

U.S. PATENT DOCUMENTS

| | | | | |
|---|---|---|---|---|
| 7,770,151 | B2* | 8/2010 | Sanjar | G06F 8/61 717/109 |
| 7,840,961 | B1* | 11/2010 | Weathersby | G06F 8/61 717/174 |
| 7,949,999 | B1* | 5/2011 | Willeford | G06F 8/656 717/120 |
| 8,677,315 | B1* | 3/2014 | Anderson | G06F 8/60 717/101 |
| 9,110,770 | B1* | 8/2015 | Raju | G06F 8/77 |
| 9,224,119 | B2* | 12/2015 | Arsanjani | G06Q 10/067 |
| 9,357,018 | B2* | 5/2016 | Fichtenholtz | H04L 67/16 |
| 9,514,034 | B1* | 12/2016 | Griffin | G06F 11/3688 |
| 9,612,821 | B2 | 4/2017 | Iyer et al. | |
| 9,645,858 | B2 | 5/2017 | Winterfeldt et al. | |
| 9,652,509 | B2 | 5/2017 | Shani et al. | |
| 9,703,687 | B2 | 7/2017 | Shani et al. | |
| 9,753,750 | B2 | 9/2017 | Shani et al. | |
| 9,772,934 | B2* | 9/2017 | Maag | G06F 11/3692 |
| 9,910,654 | B1* | 3/2018 | Brigham, II | G06F 8/61 |
| 9,916,133 | B2* | 3/2018 | Jubran | G06F 8/00 |
| 9,934,016 | B1* | 4/2018 | Acosta | G06F 8/61 |
| 2005/0114829 | A1* | 5/2005 | Robin | G06Q 10/06 717/101 |
| 2005/0193269 | A1* | 9/2005 | Haswell | G06F 11/3684 714/38.13 |
| 2006/0069717 | A1* | 3/2006 | Mamou | G06F 17/30563 709/203 |
| 2006/0253588 | A1* | 11/2006 | Gao | G06F 11/3688 709/226 |
| 2006/0253848 | A1* | 11/2006 | Mathieu | G06F 8/61 717/168 |
| 2007/0083859 | A1* | 4/2007 | Fussell | G06F 8/71 717/168 |
| 2007/0226679 | A1* | 9/2007 | Jayamohan | G06Q 10/06 717/101 |
| 2008/0201701 | A1* | 8/2008 | Hofhansl | G06F 8/60 717/168 |
| 2009/0300641 | A1* | 12/2009 | Friedman | G06F 11/3664 718/104 |
| 2010/0306007 | A1* | 12/2010 | GanapathyRaj | G06F 17/30861 705/7.12 |
| 2011/0191744 | A1* | 8/2011 | Arsanjani | G06Q 10/067 717/101 |
| 2011/0209140 | A1* | 8/2011 | Scheidel | G06F 8/61 717/172 |
| 2011/0264592 | A1* | 10/2011 | Graupner | G06Q 10/06 705/301 |
| 2012/0284697 | A1 | 11/2012 | Choppakatla et al. | |
| 2012/0324069 | A1* | 12/2012 | Nori | G06F 9/5066 709/222 |
| 2012/0331150 | A1* | 12/2012 | Rao | G06F 9/5038 709/226 |
| 2013/0124919 | A1 | 5/2013 | Subramaniam | |
| 2013/0152047 | A1* | 6/2013 | Moorthi | G06F 11/368 717/124 |
| 2013/0227573 | A1* | 8/2013 | Morsi | G06F 9/5083 718/100 |
| 2013/0266292 | A1* | 10/2013 | Sandrew | H04N 9/79 386/282 |
| 2013/0268599 | A1* | 10/2013 | Stollberg | G06Q 10/10 709/205 |
| 2014/0089495 | A1 | 3/2014 | Akolkar et al. | |
| 2014/0143765 | A1* | 5/2014 | Harley | G06Q 10/067 717/168 |
| 2014/0189641 | A1* | 7/2014 | Anderson | G06F 8/60 717/110 |
| 2014/0207927 | A1* | 7/2014 | Fichtenholtz | H04L 67/16 709/223 |
| 2014/0282353 | A1* | 9/2014 | Jubran | G06F 8/00 717/101 |
| 2014/0372989 | A1 | 12/2014 | Shani et al. | |
| 2015/0026121 | A1 | 1/2015 | Shani et al. | |
| 2015/0052501 | A1 | 2/2015 | Shani et al. | |
| 2015/0100684 | A1* | 4/2015 | Maes | G06F 11/3672 709/224 |
| 2015/0154039 | A1* | 6/2015 | Zada | G06F 9/5011 718/1 |
| 2015/0220426 | A1 | 8/2015 | Spektor et al. | |
| 2015/0242200 | A1* | 8/2015 | Niemoeller | G06F 9/5077 717/172 |
| 2015/0244773 | A1* | 8/2015 | Wang | H04L 67/10 709/201 |
| 2015/0248301 | A1 | 9/2015 | Shani et al. | |
| 2015/0263981 | A1* | 9/2015 | Wang | H04L 47/70 709/220 |
| 2015/0271023 | A1 | 9/2015 | Anderson et al. | |
| 2015/0277901 | A1* | 10/2015 | Karle | G06F 11/3688 717/120 |
| 2016/0019096 | A1 | 1/2016 | Winterfeldt et al. | |
| 2016/0034380 | A1 | 2/2016 | Shani et al. | |
| 2016/0140501 | A1* | 5/2016 | Figlin | G06Q 10/103 705/7.15 |
| 2016/0171425 | A1 | 6/2016 | Sanger | |
| 2016/0292066 | A1* | 10/2016 | Stevens | G06F 11/3624 |
| 2017/0003948 | A1 | 1/2017 | Iyer et al. | |
| 2017/0010889 | A1* | 1/2017 | Spektor | G06F 8/71 |
| 2017/0026416 | A1 | 1/2017 | Carpenter et al. | |

OTHER PUBLICATIONS

Humble, J. et al. "Continuous Delivery: Anatomy of the Deployment Pipeline", Aug. 1, 2010, 22 pages.
International Search Report for PCT/US2016/068096, dated May 26, 2017.
Lenk, Alexander, et al. "Requirements for an IaaS deployment language in federated Clouds." Service-Oriented Computing and Applications (SOGA), 2011 IEEE International Conference on. IEEE, 2011.
Li, Li, et al. "Hyperlink pipeline: Lightweight service composition for users." Proceedings of the 2013 I EEE/WIC/ACM International Joint Conferences on Web Intelligence (WI) and Intelligent Agent Technologies (IAT)—vol. 01. IEEE Computer Society, 2013.
Bass, L. et al., "Securing a Deployment Pipeline", Proceedings of the Third International Workshop on Release Engineering. IEEE Press, (2015).
Rimba, P. et al., "Composing Patterns to Construct Secure Systems", EDCC 2015. IEEE, 2015.

* cited by examiner

```
01: require '/lpt/templates/request_reply_service_template'
02:
03: module Lpt
04:   class TemplateInstance < Lpt::Templates::RequestReplyService
05:
06:     def pipeline_name
07:       "MyDeploymentPipelineRequestReplyService"
08:     end
09:
10:     def pipeline_description
11:       "A Virtual IP address request-reply service introduced to allow"\
12:       "clients to request an IP address from a regionally deployed service."
13:     end
14:
15:     def pipeline_notification_email_address
16:       'deploy-cd-notifications@example.com'
17:     end
18:
19:     def dimensionality
20:       :regional
21:     end
22:
23:     def blacklisted_dimensions
24:       %w(EU-West EU-East EU-Central AP-Northeast AP-Southeast)
25:     end
26:
27:     def deployement-service_run_as_user
28:       'apollo'
29:     end
30:
31:     // ...
32:     // remaining template content includes information from higher level
33:     // templates, such as the desired number and type of hosts per region,
34:     // rollback and steady-state latency alarm levels along with every
35:     // remaining aspect of the generated deployment pipeline not being
36:     // customized via method overrides or by declaring new methods
37:
38:   end
39: end; end
```

FIG. 4

LPT Analysis – Deployment Pipeline Criticism Report     _ ▢ ✕

1400

Service Data:

- Name: MyRequestReplyService
- Version: 2.3.8
- Source Repostiory: //repositories/github/myservice/
- Deployment Pipeline: MyServiceDeploymentPipeline
- LPT instance: //repositories/LPT/MyRRSerivce.LPT

1405

Risk Report:

| Risk: | Severity: | Correction: | Click2Fix: |
|---|---|---|---|
| Continuous Deployment Missing Auto Rollback for production stage in US-East region | High | Deploy rollback to one-box stage | Apply |
| Missing Gamma stage missing in 1 of 2 availability zones in US-West region | Medium | Add Gamma stage to availability zone | Apply |

1410    1415    1420    1425

Difference Report:

Comparison: Actual configuration of deployment pipeline in US-East and LPT Instance
No differences found

1430

Change Comparison

MAINTAINING DEPLOYMENT PIPELINES FOR A PRODUCTION COMPUTING SERVICE USING LIVE PIPELINE TEMPLATES

CROSS-REFERENCE TO RELATED APPLICATIONS

This application is a continuation of co-pending U.S. patent application Ser. No. 14/977,115, filed Dec. 21, 2015. The aforementioned related patent application is herein incorporated by reference in its entirety.

BACKGROUND

Cloud computing has become a widely adopted approach which allows an enterprise to obtain access to large amounts of computing resources. One of the primary technologies underlying cloud computing is virtualization. Virtualization allows a physical computing server to host multiple virtual machine instances, each of which executes as an independent computing system with virtual hardware components, such as a CPU and memory, managed by an operating system. Once launched, an enterprise can run applications on a virtual machine instance in the same manner as applications running on a physical computing system or server used by the enterprise. Because additional virtual machine instances can be launched on demand, cloud computing allows an enterprise to obtain computing resources as needed without having to invest and maintain an underlying physical computing infrastructure.

In addition to providing compute services (e.g., virtual machine instances), a cloud computing provider may offer a variety of other computing resources and services to enterprise customers. For example, the service provider may offer database services, persistent storage services, networking services, load balancing, auto-scaling, messaging services, cloud formation services, monitoring services etc., as part of a cloud based services offering.

Regardless of whether an enterprise decides to host a computing service on an enterprise computing infrastructure or using virtualized services from a cloud computing provider, configuring the underlying systems and services used to host a computing service can be a challenging task. As a result, engineers can spend several days configuring the systems and services needed to host even a simple service. Further, once deployed, updating the application, changing the configuration of the underlying systems and services, or deploying the application to additional systems or locations can also require substantial amounts of engineer time. For example, assume an enterprise wants to deploy a retail shopping website, where the website is backed by web-servers, application servers, and database applications deployed using services offered by a cloud computing provider. Doing requires engineers to, among other things, configure and provision a variety of virtual machine instances (or classes of instances) with the desired web and application server applications, provide the content for these systems, configure network addresses, configure database and storage services, provision security mechanisms (e.g., provisioning SSL certificates on all public facing systems), configure administrative and role based access controls, configure and launch load balancing systems, scaling groups, as well as configure monitoring, logging, and reporting applications. Once deployed, adding features or updating the software used to provide a public facing service (e.g., the retail web site) can require similar levels of configuration and provisioning.

Similar challenges are faced by the cloud computing provider in exposing the underlying cloud computing services used by the enterprise deploying the retail website. For example, launching a compute service, auto scaling service, database service, storage service, etc., requires engineers at the cloud computing provider to separately configure and provision the underlying computing systems and applications used to provide each cloud computing service.

Given the complexity of deploying even a relatively straightforward computing service, an enterprise will frequently develop a deployment or rollout process to manage how a new service is launched (or launched at a new location). The deployment process may generally specify a configuration for the service being provisioned. In some cases, the deployment process may also specify a set of testing stages—often referred to as a deployment pipeline—used to stand up a public facing service (e.g., integration tests, followed by alpha, beta, and gamma stages) along with success, failure, or rollback conditions for each stage. The same deployment pipeline may be used to update the applications, systems, or services used to provide the public facing service or when the underlying systems or services used to provide such a service are changed. Similarly, the service provider may define a deployment pipeline used to push changes in the application source code (e.g., bug fixes or new features) out to the production systems hosting a given service. Such a pipeline may specify integration tests, alpha, beta, and gamma testing stages as well as workflows for approving or completing each stage or rolling an application back to a prior state if a new version of the application being pushed into production fails an approval requirement or proves to be disruptive to the service.

However, this approach leaves it to engineers managing a given deployment pipeline to both configure and provision each system and service correctly, as well as to follow any enterprise best practices in composing a deployment pipeline. Doing so can lead to inconsistent results across different deployment pipelines for otherwise similar services or applications. Further, this approach limits ability of an enterprise to reuse or standardize a deployment process. Instead, engineers frequently, "cut, paste, and customize" elements of an existing deployment pipeline for use with a new service (or new instances of an existing service). A similar approach occurs when an enterprise relies on a change management process to update the features or requirements of an application or service. In such cases, engineers have to spend substantial amounts of time to plan how to deploy and test an update to the systems or applications providing a public facing service. Accordingly, for an enterprise managing even a handful of deployment pipelines, maintaining, updating, or changing the set of deployment pipelines as best practices evolve or building new deployment pipelines for new computing services can require substantial engineering resources. As a result, managing a set of deployment pipelines can become a distraction for the enterprise in improving the quality or features of the actual applications or services being deployed through a deployment pipeline.

BRIEF DESCRIPTION OF DRAWINGS

Various embodiments in accordance with the present disclosure will be described with reference to the drawings, in which:

FIG. 4 illustrates an example of source code for an instance of the live pipeline template first illustrated in FIG. 3, according to one embodiment.

FIG. 14 illustrates an example interface identifying issues in a production pipeline surfaced by using live pipeline template analysis, according to one embodiment.

DETAILED DESCRIPTION

Figure 1:
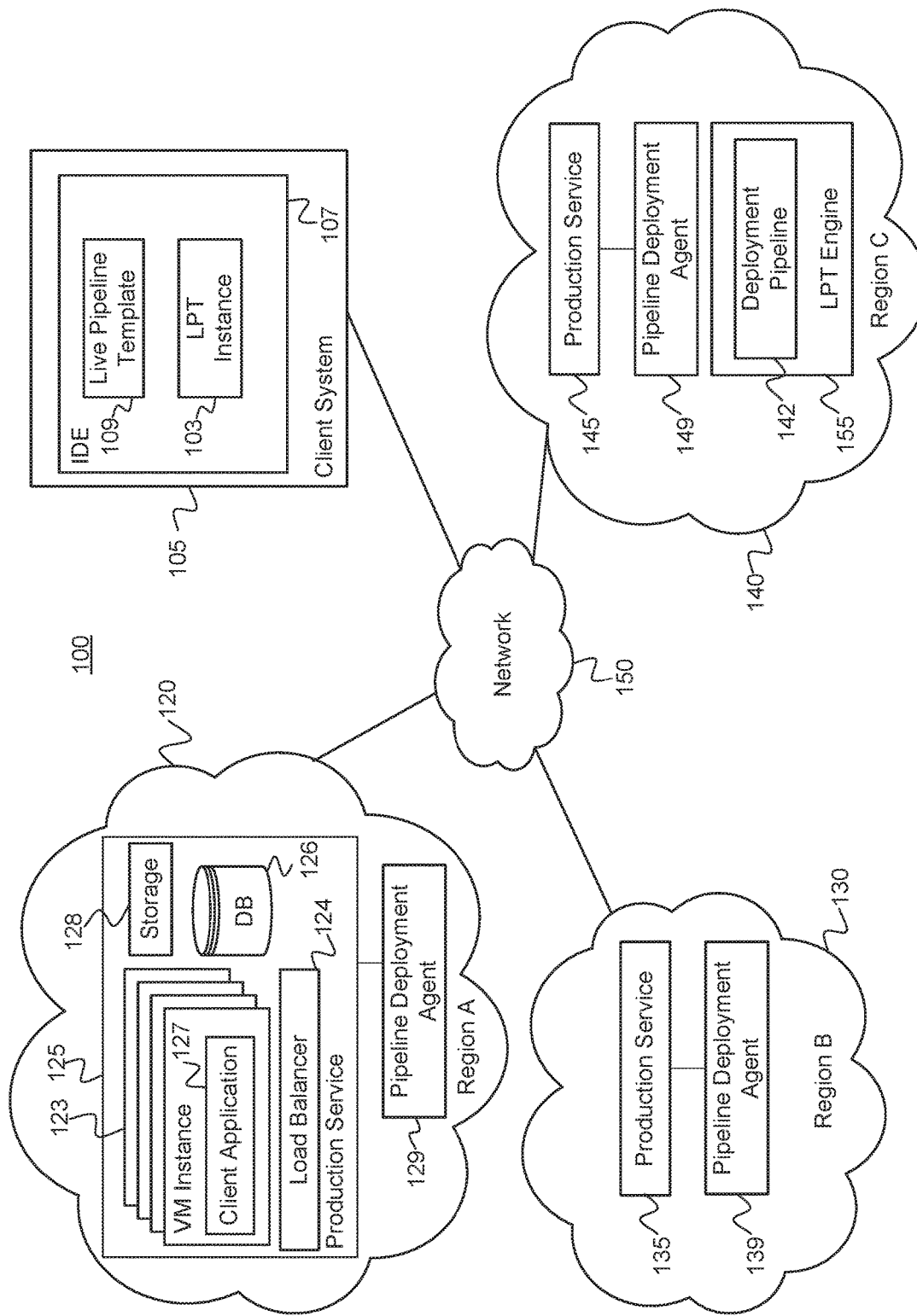
FIG. 1 illustrates an example of a cloud computing environment with multiple regions, each hosting a regional instance of a production computing service deployed via a continuous deployment pipeline, according to one embodiment.

The availability and variety of computing services offered by cloud computing providers continues to grow. However, it becomes challenging for a cloud computing provider to deploy and maintain a collection of computing services offered to customers (or used internally). Enterprises deploying and maintaining a collection of applications or services to a cloud provider or hosting applications or services on their own computing infrastructure face similar challenges.

Embodiments presented herein provide techniques for managing a deployment pipeline using an inheritable and extensible source code template—generally referred to as a live pipeline template (LPT). As described in detail herein, live pipeline templates allow both the enterprise customer and the cloud computing provider to define and manage deployment pipelines which, in turn, are used to launch, maintain, and update the services and systems used to host and provide computing services. In other words, a live pipeline template may generally be used to encapsulate a comprehensive model of a deployment pipeline and production configuration for a given type of application or service. Deployment pipelines built using a live pipeline template are sometimes referred to as a "continuous deployment pipeline," as changes to the application or service being deployed via such a pipeline may automatically propagate through pipeline stages towards a production deployment (or rolled back if errors or conflicts are detected).

In one embodiment, rather than develop a deployment process or strategy to deploy a new application or service from scratch (or to deploy an existing application or service to a new location), a developer may specify a small amount of information about the particular service or application in the source code of a live pipeline template. The information is then used to generate a new instance of that live pipeline template, customized using the source code specified by the developer. For example, the developer may specify high-level details about the application or service in the live pipeline template, such as a service name, administrative contact(s), and where the pipeline should (or should not) be deployed, such as a specific set of cloud computing regions offered by a cloud services provider. Importantly, modeling the deployment process for a given application or service type using a live pipeline template brings the configuration of the deployment pipeline under source code control. That is, instead of specifying a deployment process using change management orders or ad-hoc workflows, a deployment pipeline is specified using source code of a live pipeline template, which may then be localized by a developer for each instance of that live pipeline template.

The remainder of the live pipeline template encapsulates best-practices for configuring, deploying, and maintaining an instance of the type of service corresponding to the live pipeline template. For example, the live pipeline template may specify a variety of software or other artifacts required by the deployment pipeline, including, e.g., a deployment system configuration, deployment users, pipeline stages for deploying or updating the application, host classes, source code repositories, virtual machine images or configurations, network requirements (e.g., virtual IP addresses for virtual machine instances to use), SSL certificates, user names, identity and access control information, content for reporting dashboards, performance metric criteria, rollback and steady-state monitors, monitoring alarms, etc.

Overriding only specific elements of a live pipeline template as needed allows the live pipeline template to be used to generate a service-specific instance of a continuous deployment pipeline, without a developer having to configure, correctly, a deployment pipeline which follows all of the best practices in deploying an application of a given service type. Instead, the live pipeline template encapsulates the best practices needed for the service type and may be used to automatically build and configure such practices into the service-specific instance of the deployment pipeline. Accordingly, the time needed to configure and build a deployment pipeline for a complex production service may be reduced from days (or even weeks) to hours.

In one embodiment, once the high-level details used to define an instance of a new application or service based on the live pipeline template are specified, the instance is used to generate a comprehensive model of the deployment pipeline. The comprehensive model may provide a fully-specified configuration for a deployment pipeline to use to deploy that application or service. This comprehensive model, generally referred to as an application definition, may be used during an LPT synthesis process to configure the systems and services needed to instantiate the deployment pipeline. The application definition may be specified using a machine readable interchange format, e.g., as a JSON or XML, document. During the synthesis process, each system and service needed by the deployment pipeline is launched, configured, or otherwise readied for use. Following LPT synthesis, the resulting deployment pipeline may be used to deploy and maintain an instance of a production application or service. That is, the deployment pipeline may be used to ready the application or service to receive customer traffic, as well as push updates or new features to the service through the pipeline into production.

In one embodiment, an LPT engine may include a set of leaf system drivers used to configure a set of services or systems as specified by the application definition. For example, each leaf system driver may provide a software application corresponding to a given leaf system included in the deployment pipeline modeled by an application definition, such as a monitoring service, an alarm service, a deployment service, etc. Each leaf system driver may specify what parts of the application definition should be enacted by other drivers before being executed. For example, a leaf system driver which configures an alarm service may require that a monitoring service be configured and operational before the alarm service is configured and launched. That is, each leaf system driver may enforce any dependencies needed for the corresponding leaf system to operate correctly. To do so, the LPT engine may identify what elements of the application definition have been instantiated, and as dependencies are satisfied, launch one or more of the leaf system drivers. In turn, the leaf system drivers execute API calls to bring a corresponding leaf system in conformity with the application definition, which allows additional leaf system drivers to be executed, until the deployment pipeline is fully enacted.

Live pipeline templates allow the enterprise to set minimum, automatically-enforced standards for deploying applications of a given service type. Further, inheritance mechanisms supported by a given source code language may be used extend a base live pipeline template with service or domain specific information. For example, an enterprise may specify a minimum set of best practices that any deployment pipeline should follow, regardless of an application service type. A live pipeline template for a given service-type may inherit from the enterprise-wide template and add (or override) aspects of the enterprise-wide live pipeline template that are particular to the specific service type. Further still, a given business unit could inherit from service-specific template and specify business unit information (e.g., user names or access rights). Lastly, for a specific instance of a live pipeline template, a developer may subclass the business unit template and need only to specify instance specific details of a given service, such as a service type, service name, administrative contact(s), and what cloud computing regions the service should be deployed.

Bringing the configuration for a deployment pipeline under source code control allows any changes to the best practices associated with that deployment pipeline to be peer-reviewed and evaluated prior to being checked in and implemented in instances of that pipeline. In one embodiment, as changes to the deployment configuration specified in a live pipeline template are committed, the LPT engine may update the configuration of any deployment pipelines that are based on that live pipeline template. That is, a deployment pipeline (used to push updates or changes in an application or service into production) may itself be the target of a "shadow" or "meta-pipeline" used to push changes in the deployment pipeline into production.

In addition to providing for peer review of any changes prior to being committed, the meta-pipeline may monitor whether a given change to a deployment pipeline being pushed into production results in errors or conflicts and should be rolled back. Further, in addition to responding to changes in a live pipeline template, a meta-pipeline may monitor a deployment pipeline and respond to changes in the cloud computing environment. For example, the LPT engine may be configured to automatically build a deployment pipeline from a live pipeline template (which can then configure and deploy the underlying service or application) in new (or additional) computing regions, zones, etc., as they become available from a cloud computing provider (assuming any necessary service dependencies in place in such regions, zones, etc. are satisfied).

In addition to the LPT synthesis process just described, the LPT engine may also perform an LPT analysis process in order to evaluate the configuration of a deployment pipeline for a given application or service, regardless of whether that application or service was deployed based on a live pipeline template or using the LPT synthesis process. For example, in one embodiment, the leaf system drivers may be configured to inspect the configuration of a deployment pipeline and build an application definition that matches or is compatible with the actual configuration of that deployment pipeline. For example, the leaf system drivers could identify what stages are included in a deployment pipeline, what alarms or monitors are configured for each stage, what leaf systems are configured or deployed at each stage (e.g., what virtual machine instances are provisioned, launched and put into production), what host classes are defined, etc., and how the leaf systems are configured. The LPT engine then generates an application definition describing the identified configuration using the same machine readable interchange format generated by the LPT synthesis process, e.g., a JSON or XML document.

In one embodiment, the LPT engine may evaluate the "ground truth" application definition against a set of rules to identify aspects of the deployment pipeline that fail to satisfy the requirements of a given rule. The rules may be used to ensure that a deployment pipeline follows the best practices established by an enterprise. For example, a rule may determine whether a deployment pipeline includes gamma and one-box testing stages preceding every production stage or confirm the existence of an auto-rollback monitor for a deployment system performing the one box and production stages in the deployment pipeline. More generally, the rules may be specified using conditional statements or unconditional requirements or attributes that should be followed or present. In some cases, the LPT engine block a deployment pipeline from being activated until it satisfies one or more of the rules. However, in addition to identifying aspects of a deployment pipeline that do not satisfy one or more rules, the LPT analysis process may also suggest actions needed to "heal" a deployment pipeline or bring it into conformity with best practices. That is, the LPT engine may pair a given rule violation with a solution for complying with the rule. Thus, the LPT engine may offer a deployment or development team with education and tools to comply with best practices adopted by the enterprise as a whole (as expressed in the rules).

Further, the relevant business unit can specify which rules are applicable, and how (or if) a given LPT rule should be enforced within that business unit, e.g., whether to block a deployment pipeline or just alert an developer that some aspect is out of compliance. In one embodiment, the LPT engine may use the results to automatically change the configuration of a deployment pipeline to conform to one or more of the rules. Of course, any changes could also be routed to a developer or administrator before being made. The LPT analysis process may be repeated at specific intervals to identify any changes that may have been manually made by an engineer (i.e., changes that bypass a meta-pipeline used to manage a continuous deployment pipeline).

In other cases, the LPT engine could build an application definition from a live pipeline template and compare it to the "ground truth" application definition generated by the LPT analysis process. Such differences could be presented to a developer as suggestions for changing the actual deployed pipeline to match the configuration specified in live pipeline template. This approach allows the LPT analysis process to bring a deployed pipeline under source code control of a live pipeline template. That is, the actual deployed pipeline may become the target of a meta-pipeline following any changes made to the deployed pipeline made based on differences between the live pipeline template application definition and the "ground truth" application definition. Further, comparing the "ground truth" application definition generated by the LPT analysis with different application definitions generated from a set of LPT templates may be used to provide a developer with a suggestion of which LPT template is most compatible with an actual deployment pipeline.

Further, in one embodiment, the LPT analysis process may be used to help identify the best practices that should be used for a deployment pipeline associated with a given application or service type. For example, a cloud computing provider margining deployment pipelines for a large number of applications or services may use the LPT analysis process to identify patterns or common practices in "ground truth" application definitions for a group of pipelines which have a common service type pattern. Doing so may allow the cloud computing provider to build live pipeline templates that reflect a set of best practices that have been "baked-in" to a collection of continuous deployment pipelines over time.

Advantageously, live pipeline templates allow an enterprise to ensure that operational best practices for availability, security, testing, performance, deployment, and monitoring are followed in continuous deployment pipelines used to push applications, services, and upgrades into production. In addition, live pipeline templates combine enforcement and validation with tools to bring applications or services into compliance with deployment best practices, keep deployment pipelines for applications or services up-to-date as operational guidelines or best practices evolve, and help developers set up new services correctly. Doing so may substantially reduce outages caused by defects in the deployment process that are easily preventable and to reduce developer time spent on operational setup and configuration.

Note, some embodiments are described herein relative to an example of a cloud computing provider using live pipeline templates to deploy and manage a collection of production services offered to enterprise customers. However, one of skill in the art will readily recognize that embodiments described relative to the cloud computing provider may be adapted or offered to an enterprise using the services of the cloud provider to maintain a collection of applications or services hosted by the cloud provider as well as adapted for deployment pipelines managing applications or services hosted using an enterprise computing infrastructure.

FIG. 1 illustrates an example of a cloud computing environment with multiple regions, each hosting a regional instance of a production computing service deployed via a continuous deployment pipeline, according to one embodiment. As shown, the computing environment 100 includes a client computing system 105 and three cloud computing regions—region A 120, region B 130, and, region C 140 connected by public computing networks 150 (e.g., the internet). Client system 105 is included to be representative of a general purpose computing system such as desktop computer and laptop computer systems, as well as representative of mobile computing devices such as tablets and smart phones configured with service console applications or web browser software.

Cloud computing regions 120, 130, and 140 generally correspond to a region defined by a service provider in offering web services to client systems (e.g., the services used to build production service 125). Developers may provision, launch, and manage virtualized computing resources within each cloud computing region 120, 130, and 140. While cloud computing regions may be drawn along arbitrary boundaries, cloud computing regions often correspond to geographic, national, or fault tolerance boundaries, where computing resources in one region are deployed and managed in a manner that is generally isolated from other regions. More specifically, cloud computing regions 120, 130 and 140 may each correspond to a data center (or data centers) located in a particular geographic area. Data centers in different regions may help provide fault-tolerant web services, e.g., should one data center in a region become inaccessible, other data centers in that region (or other regions) may continue to operate with little or no interruption to the webs services themselves. Further, the provider may enable multiple physical or logical zones within a given cloud computing region. For example, a single data center used to provide a cloud computing region may offer multiple, fault tolerant availability zones, where a service disruption in one availability zone does not impact other availability zones within the same cloud computing region (or other regions) and the availability zones within a region may provide inexpensive, low-latency network connectivity to other availability zones within the same region.

In the example of FIG. 1, assume an enterprise customer has deployed a production service 125 in region 120, a production service 135 in region 130 and a production service 145 in region 140 using the cloud computing services offered by a cloud provider. As shown, production service 125 includes a set of virtual machine (VM) instances 123, a database 126, and persistent storage 128. In addition, the production service 125 includes a load balancer 124 used to distribute requests received by the production service 125 to a client application 127 on one of the VM instances 123. Returning to the example of a retail website, assume the client application 127 on each VM instance 123 provides web and application servers configured to access database 126 and storage 128 as needed in order to process HTTP requests received from client browsers. As requests are received, load balancer 124 distributes the HTTP requests to the application 127 on one of the VM instances 123. As users request information and order products, application 127 may read and write data related to customer requests or purchases to the database 126 and storage 128. Further, production service 125 could also incorporate a variety of other computing services offered by the cloud provider. For example, the count of VM instances 123 used by production service 125 could be increased or decreased based on demand using an auto-scaling service. Similarly, a cloud monitoring service could monitor the health of VM instances 123 as well as gather performance metrics related the production service 125. Although not shown in the same degree of detail, the production service 135 in region 130 and production service 145 in region 140 could have a deployed configuration that matches the configuration of production service 125 in region 120.

As shown, production service 125, 135, and 145 each have a corresponding pipeline deployment agent 129, 139, and 149. Pipeline deployment agent 129 generally includes software applications used to automate the deployment of software (e.g., application 127) to production service 125. Pipeline deployment agents 139 and 149 generally provide the same function for production services 135 and 145, respectively. More specifically, the pipeline deployment agents 129, 139, and 149 may be configured to continuously integrate software, related scripts, artifacts, or configuration states, etc., into the production service 125, 135, and 145. For example, the pipeline deployment agent 129 may build executables of the application 127 from a source code repository, run automated test suites on the executables to identify errors or conflicts. Provided the automated testing is successful, then the pipeline deployment agent 129 may begin pushing the executables into increasingly broader production environments. At each stage, the pipeline deployment agent 129 may monitor the production service 125 to ensure the software being deployed continues to function correctly or within any limits on performance metrics throughout the deployment process.

Pipeline deployment agent 129 may protect the production service 127 from downtime during deployment by rolling updates to the application 127 on VM instances 123 in stages and monitoring for errors or conflicts during each stage. If errors or unanticipated conflicts or integration problems arise while the software is pushed out to the production service 125, the pipeline deployment agent 129 can roll back the application 127 on any updated VM instances to a prior version and provide the developers with logs and data regarding an interrupted deployment.

As noted, a deployment pipelines may include a set of stages used to build, test, and release software and related artifacts into the production services 125, 135, and 145. For example, the deployment pipeline used by pipeline deployment agents 129, 139, and 149 may include pre-production testing stages such as an alpha or integration testing stage and a beta testing stage where the application is tested using automated tests. Once the pre-production stages are successfully completed, gamma or deployment integration testing may be performed with the application deployed in a production environment, but before proceeding to deployment stages that process actual customer traffic or data. Following gamma testing, customer-traffic-taking stages may include a one-box stage to test a single production instance of an application (e.g., by updating the application 127 on a single VM instance 123). After a period of time specified by the deployment pipeline for one-box testing, the pipeline deployment agent 129 may begin to fully deploy the application to production service 125. The deployment pipeline may include rollback monitors for each deployment stage, as well as alarms for service metrics, such as alarms on VIP metrics or JMX metrics. Such alarms may be used to automatically detect (and roll back) a deployment that shows signs of being disruptive to the production service 125. A Deployment pipeline for production services 135 and 145 may include similar testing and deployment stages to continuously deploy software into production.

The configuration of a deployment pipeline can have a significant impact on how successful software updates can be tested and put into production (or blocked or rolled back after failing a deployment stage). Further, as noted above, building and configuring a deployment pipeline can require significant amounts of developer time. To address these (and other) issues, in one embodiment, a deployment pipelines 142 may itself be built and deployed using a live pipeline template (LPT) engine 155. For convenience, LPT engine 155 is shown within region 140. However, regions 120 and 130 may also include an instance of the LPT engine 155.

In one embodiment, the live pipeline template 109 provides source code which generally defines a deployment pipeline for a given type of application or service. While the programming language used may be specified as a matter of preference, any language generally supporting object-oriented classes and inheritance may be used. As shown, client system 105 includes an integrated development environment (IDE) 107, which may be used to generate a service-specific instance of a live pipeline template 109, i.e., to generate LPT instance 103 which inherits the source code of the live pipeline template 109. For example, the live pipeline template 109 may define a base class that models a particular type of production service, such as a workflow service, a request reply service, etc. A developer may specialize the live pipeline template 109 to create LPT instance 103 by specifying instance specific details for a production service to be deployed using a deployment pipeline corresponding to the LPT instance 103 of the live pipeline template 109. After specifying the instance specific details, the source code of the LPT instance 103 may be compiled and executed (or interpreted) to generate an exact configuration for a deployment pipeline which includes the service or instance specific details of the production service specified by LPT instance 103 along with all the best practices, safety mechanisms, deployment stages, etc., in the live pipeline template 109 that were not explicitly specified by the developer.

In one embodiment, the LPT engine 155 is configured to build, update, and analyze the deployment pipelines 142. To do so, the LPT service 155 may use LPT instance 103 to generate a complete (and correct) configuration for a deployment pipeline corresponding to LPT instance 103. Further, the pipeline deployment agents 129, 139, and 149 may use the resulting deployment pipeline 142 to build and configure deployment pipelines in the cloud computing regions 120, 130, 140.

Further, in one embodiment, the LPT engine 155 may be configured to propagate changes to a deployment pipeline built from LPT instance 103 using a meta-pipeline. That is, just as a deployment pipelines may be used to deploy changes to the production services 125, 135, and 145, a meta-pipeline may be used to propagate changes to the deployment pipelines based on changes to the live pipeline template 109 or LPT instance 103. For example, developers may change the content of the live pipeline template 109 to reflect changes in the best practices for deploying a given service type as such practices evolve or change. For example, the live pipeline template 109 could be updated to include a configuration for new services offered by a cloud provider that could improve a deployment pipeline built using the live pipeline template 109. Similarly, as best practices for a given service type change within an enterprise, the live pipeline template 109 could be updated to reflect the changing requirements of the enterprise. As another example, changes in the service-specific information (i.e., in LPT instance 103) could also be propagated to a deployment pipeline using the meta-pipeline. For example, a developer could change which regions the LPT engine 155 builds and configures a deployment pipeline in by updating the source code of the LPT instance 103 or change administrative contacts or override other aspects of the base configuration to suit the needs of a particular case. In each of these examples, proposed changes to a deployment pipeline may be peer reviewed before being committed in the source code of live pipeline template 109 or LPT instance 103 and deployed to the pipeline in manner controlled by the meta-pipeline.

Figure 2:
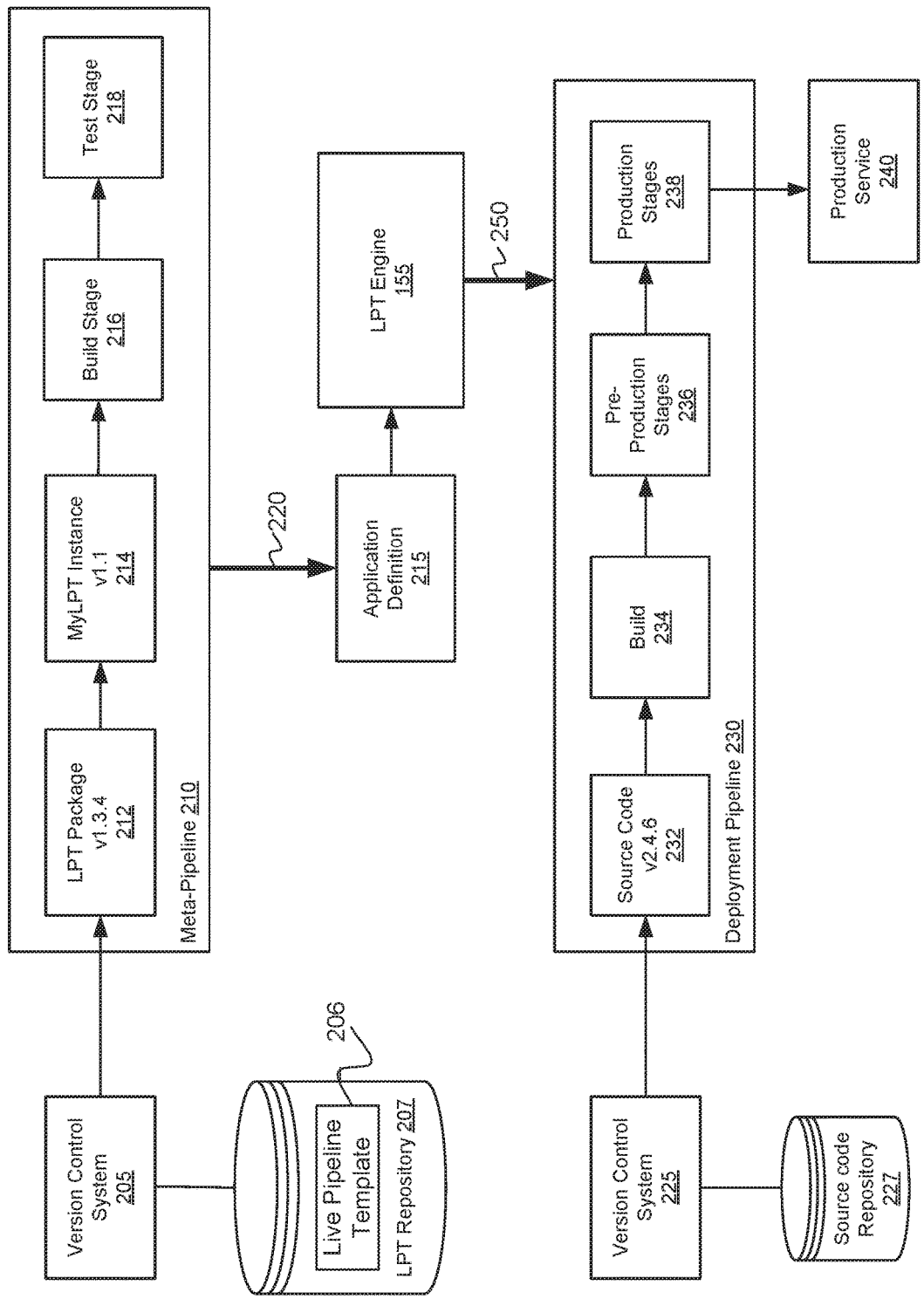
FIG. 2 illustrates an example of a "meta-pipeline" used to build and configure a continuous deployment pipeline for a production computing service, according to one embodiment.

FIG. 2 illustrates an example of a meta-pipeline 210 used to build, configure, and update a continuous deployment pipeline 230 for a production computing service 240, according to one embodiment. As shown, the meta-pipeline 210 includes a version of an LPT package 212 and a version of an LPT instance 214, which inherits from the LPT package 212. The meta-pipeline also includes a build stage 216 and a test stage 218. The LPT package 212 and LPT instance 214 generally correspond to specific revisions of a live pipeline template 206 stored in stored in LPT repository 207 along with any related artifacts or files needed to build and execute the live pipeline template, e.g., files describing a build process and any dependencies needed to build an application target from the LPT instance 214.

Version control system 205 is used to manage revisions to the source code of the live pipeline template 206 stored in LPT repository 207. The version control system 205 allows an enterprise to manage and control how changes to the source code of live pipeline template 206 (and instances of this live pipeline template) are deployed via the meta-pipeline 210. That is, version control system 205 brings the configuration of deployment pipeline 230 under source code control. Typically, a senior developer or engineer may be responsible for reviewing and approving any changes to the source code of live pipeline template 206 (and instances of this live pipeline template). Doing so ensures that deployment pipeline 230 reflects the best practices and requirements of an enterprise using deployment 230 to deploy production service 240.

As shown by an arrow 2220, the output or target of the meta-pipeline 210 may be an application definition. For example, when LPT package 212 and LPT instance 214 are first committed to the version control system 205 (i.e., once version 1.0.0 is available), the meta-pipeline 210 may be used to build application definition 215. In one embodiment, the application definition 215 may specify a comprehensive model which fully specifies a configuration of a deployment pipeline 230 used to build and deploy production service 240. The application definition 215 may be specified using a machine readable interchange format, e.g., as a JSON or XML document. In turn, the LPT engine 155 may configure, provision, and build the first instance of deployment pipeline 230.

During a build stage 216, the LPT package 212 and LPT instance 214 are compiled to generate software that can generate the application definition 215. For example, the LPT package 212 and LPT instance 214 may comprise a software package which can be built using the well-known Ant build tool. Once built, the resulting software package may be executed (or interpreted) to generate the application definition 215. Illustratively, the meta-pipeline 210 includes a test stage 218 used to evaluate the results of the build stage 216 (i.e., the application definition 215). For example, the test stage 218 may evaluate the application definition 215 against a set of rules specifying minimum requirements for a deployment pipeline. Doing so could help ensure a developer does not override an element of the LPT package 212 in LPT instance 214 in a manner that results in an incomplete or inoperable deployment pipeline 230 or results in a deployment pipeline 230 that does not meet certain minimum standards or requirements specified by an enterprise.

Once built (during build stage 216) and tested (during test stage 218), the resulting application definition 215 may be provided to LPT engine 155. As represented using an arrow 250, the LPT engine 155 may build and configure deployment pipeline 230, as specified in the application definition 215. In the example of FIG. 2, deployment pipeline 230 includes a build stage 234, pre-production stages 236, and production stages 238. In one embodiment, to build the deployment pipeline 230, the LPT engine 155 may invoke a set of leaf system drivers used to configure a corresponding set of leaf systems underlying the deployment pipeline 230. That is, the leaf system drivers are used to configure the underlying systems, applications, or services that, collectively, comprise the deployment pipeline 230. For example, the leaf system drivers may configure a deployment system configured to manage the pre-production stages 236 and production stages 238, create host classes of VM instances, configure virtual networks addresses and routing between computing resources, provision and configure VM instances or other virtual computing resources, set up monitoring alarms, deployment rollback thresholds, performance monitors, etc., as needed in order to stand up deployment pipeline 230.

In one embodiment, following an initial launch of the deployment pipeline 230, the meta-pipeline 210 may propagate changes in the live pipeline template 206 into production, as changes to live pipeline template 206 are committed via version control system 205. That is, the meta-pipeline 210 may be used to propagate changes to the live pipeline template 206 reflected in published versions of the LPT package 212 and LPT instance 214 to the deployment pipeline 230. In one embodiment, the meta-pipeline 210 may automatically propagate new versions of LPT package 212 or LPT instance 214 into production in deployment pipeline 230 as new versions are committed and published by the version control system 205. Of course, the meta-pipeline 210 may also be invoked on-demand to push new versions of a live pipeline template 206 to the deployment pipeline 230.

Once the LPT engine 155 completes the initial provisioning and configuration of deployment pipeline 230, the deployment pipeline 230 may be used to deploy (and update) the software applications and systems which provide the production service 240. The source code repository 227 may store the source code of the production service, along with the related configuration, data, and other artifacts may be stored in the source code repository 227. Changes to the source code of production service 240 may be subject to the version control system 225, where changes are first reviewed before being committed. As changes to the source code of production service 240 are committed, resulting in new a build package of source code 232, the deployment pipeline 230 may update production service 240 via the deployment pipeline 230.

As shown, e.g., the deployment pipeline 230 includes a build stage 234 which compiles source code 232 to generate candidate executables for deployment. In this example, the executables generated during the build stage 234 are first passed to pre-production stages 236 and, if the executables pass the testing performed at this stage, are then passed to production stages 238. During the pre-production stages 236 the executables are tested using integration tests, test suites, and sample data, etc., prior to being used to process customer traffic. During the production stages 238, the executables may be pushed into increasingly broader production use until the deployment of the updated application within production service 240 is complete. For example, the production stage testing may include a gamma integration stage test, a one-box test, and finally, a full production deployment. Also during the production stages 238, performance monitors and alarms may monitor the performance of the executables as deployed in the production environment. If the executables fail at a rate that exceeds an alarm threshold, or otherwise cause an alarm to be triggered due to poor performance, the deployment pipeline 230 may roll back the deployment. In addition, the deployment pipeline 230 may generate logs and related data used by a development team to understand what caused the deployment to be rolled back.

Figure 3:
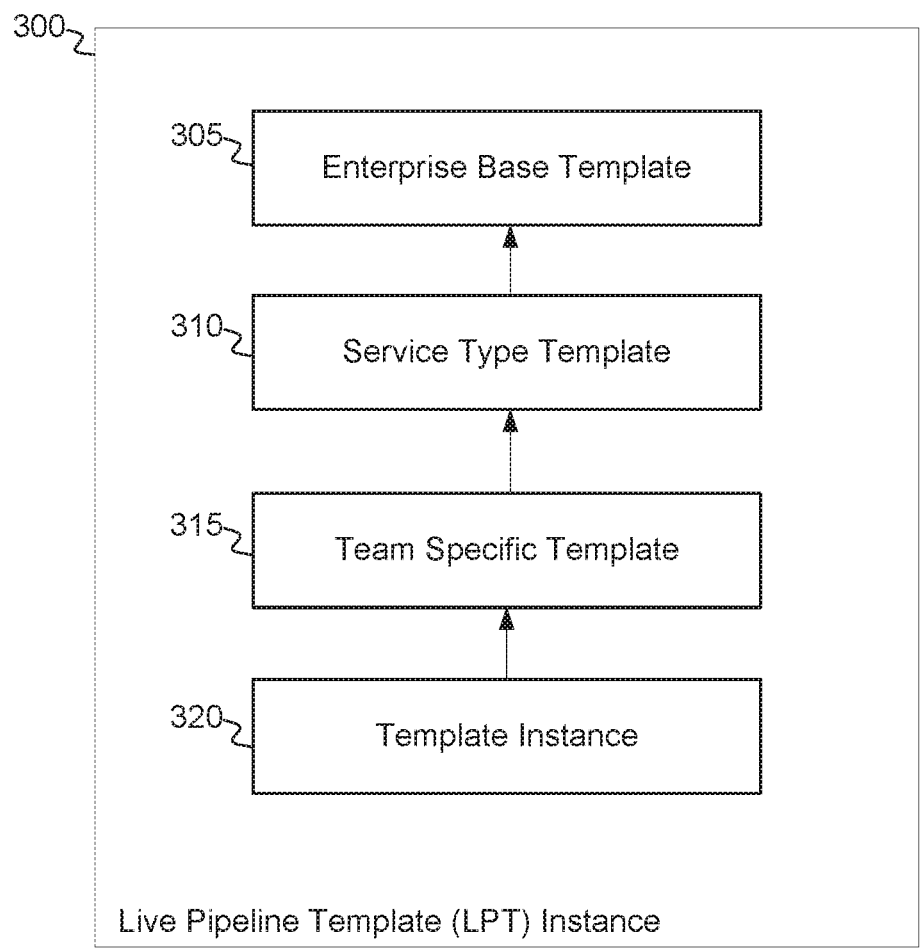
FIG. 3 illustrates components of a live pipeline template (LPT) instance, which inherits deployment pipeline configuration data from other pipeline templates, according to one embodiment.

FIG. 3 illustrates components of a live pipeline template (LPT) instance 300, which inherits deployment pipeline configuration data from other pipeline templates, according to one embodiment. As shown, the LPT instance 300 includes an inheritance hierarchy of deployment pipeline templates, where each template in the hierarchy can override aspects inherited from other pipeline templates in the hierarchy and add additional configuration data to the LPT instance 300. In this particular example, the LPT instance 300 includes an enterprise base template 305, a service-type template 310, a team specific template 315, and a service-specific template 320. Of course, one of skill in the art will recognize that the number of templates, the pattern of inheritance among templates, or what information is stored in each template may be tailored as needed for a given deployment pipeline or enterprise practices In one embodiment, the enterprise base template 305 may be used to encapsulate a set of best practices or requirements for a continuous deployment pipeline that should be followed by any deployment pipeline used within a particular enterprise. For example, consider a cloud service provider offering customers compute, database, storage, networking, and monitoring services, etc. Despite the different service types, some deployment practices may be common to each of the computing services offered by the cloud provider. For example, an enterprise may require that any deployment pipeline used to update the software underlying these computing services should undergo integration testing prior to be being used with customer traffic and should initially be deployed in production with customer traffic using a one box stage. In such a case, these requirements could be captured in the source code of enterprise base template 305.

As shown, the service-type template 310 inherits the deployment pipeline configuration specified in in the enterprise base template 305. The service-type template 310 could be used, e.g., to specify deployment pipeline requirements that are particular to a given service type. Continuing with the example of a cloud services provider, the service-type template 310 could include configuration data that is particular to a given one of the services offered to customers. For example, a deployment pipeline used to update the software and systems offering a virtualized database service could include a specific collection of beta tests used to test the latency of queries used to read/write data to a test instance of a database provisioned using the service. Similarly, a deployment pipeline for a compute service could include testing stages that launch different VM instances according to each instance configuration type offered by the provider and tests the VM instances for correctness. More generally, each computing service offered by the cloud computing provider may have a distinct set of deployment requirements that are encapsulated in the corresponding service-type template 310. In addition to specifying additional configuration parameters for a deployment pipeline, the service-type template 310 may override or extend any of the requirements specified in the enterprise base template 305. Typically, however, the base template 305 includes enterprise best practices or requirements that should be included in any deployment pipeline used within a given enterprise and not overridden in sub-classing the enterprise base template 305.

The team specific template 315 inherits from both the enterprise base template 305 and the service-type template 310 and may extend or override aspects of the enterprise base template 305 or the service-type template 310. The team specific template 315 may include configuration data used by a development team responsible for managing a given service. Again using the example of the cloud computing provider offering computing services to enterprise customers, the team specific template 315 may extend the service-type template 310 to include information about a development team managing a production service being deployed via a deployment pipeline built from LPT instance 300. For example, the development team may use the service-type template 310 to include team information in the live pipeline template 300 such as run as-user names, access control rights, etc., for the leaf systems included as part of a continuous deployment pipeline as specified by the enterprise base template 305 and the service-type template 310.

Lastly, the template instance 320 of LPT instance 300 inherits the configuration of a deployment pipeline specified in the enterprise base template 305, the service-type base template 310, and the team specific template 315. In one embodiment, the template instance 320 extends these templates (or overrides methods in these templates) with service or instance specific parameters related to a specific instance of a deployment pipeline used to deploy a production service. The template instance 320 may extend the other templates with service-specific information, such as a service name, administrative contact(s), and where a deployment pipeline built from live pipeline template 300 should be deployed, e.g., to a specified list of cloud computing regions offered by a cloud services provider.

For example, FIG. 4 illustrates source code for an example of the template instance 320 of the LPT instance 300 illustrated in FIG. 3, according to one embodiment. In this example, the source code comprises a Ruby module 400 written in the Ruby programming language.

As shown at lines 1-4, Ruby module 400 extends a service type template 310 for a deployment pipeline with a service type of a "request reply service." Specifically, line 4 declares a class having a name of "TemplateInstance" as a subclass of another pipeline template class named "Lpt::Templates::RequestReplyService." Lines 06-29 of Ruby module 400 specify methods which override methods of the service type template 310 with service or instance information for an instance of a deployment pipeline built from the LPT instance 300.

First, lines 06-08 declare a Ruby method named "pipeline_name" and define a name for a deployment instance of a production pipeline. Lines 10-13 declare a Ruby method named "pipeline_description" and provide a text description for this specific instance of a live pipeline template. In this example, the description notes that the deployment pipeline being defined is used to deploy a request reply service, which itself is used to provide a regional request/reply service which can provide IP addresses to requesting clients.

Lines 15-17 of the Ruby module 400 declare a Ruby method named "pipeline_notification_email_address" and specifies an email address for a deployment pipeline built from LPT instance 300. Such an email address could be used to send messages about the deployment pipeline to members of a development team. For example, the deployment pipeline could automatically send email messages about the success (or failure) of each testing stage in the deployment pipeline to the development team responsible for building and managing the particular service deployed using the deployment pipeline.

Lines 19-21 declare a Ruby method named "dimensionality" used to specify a logical unit of deployment for the deployment pipeline. In this case, the dimensionality for the pipeline is at the level of a cloud computing region, i.e., at the level of distinct geographical regions in which the cloud computing provider offers services. In other cases, a deployment pipeline could be built to deploy software in individual availability zones within a cloud computing region, within a private enterprise network, or within other logical or physical zones where computing services may be deployed. Relatedly, lines 23-25 declare a Ruby method named "blacklisted dimensionality," which specifies a set of regions where a deployment pipeline corresponding to LPT instance 300 should not be deployed. In this example, the blacklisted regions include cloud computing regions in Europe and Asia, leaving the production service to be deployed in data centers for regions in the U.S. or North and South America. As described below, specifying a "blacklist" of cloud computing regions where a deployment pipeline should not be configured allows that deployment pipeline to automatically be deployed to new computing regions that become available (provided any service dependencies of the deployment pipeline are also satisfied within a new computing region). Of course, another method declared in Ruby module 400 could specify a positive list where the deployment pipeline should be deployed. Lines 27-29 of the Ruby module 400 declare a Ruby method named "deployment-service_run_as_user." This method specifies a user name for a deployment service accessed by a leaf system driver in provisioning and configuring the test stages (or other elements) of a deployment pipeline built from the LPT instance 300.

Lastly, lines 31-36 include a comment noting that the template instance 320 represented by Ruby module 400 inherits the template content from the higher-level templates, i.e., from the enterprise base template 305, the service-type base template 310, and the team specific template 315 in this example. As illustrated by Ruby module 400, sub-classing from higher level templates (i.e., from the "RequestReplyService" template in this case) allows a developer to generate an instance of a live pipeline template (e.g., LPT instance 300) used to build a deployment pipeline by specifying a small amount of information about the particular service or application in the source code of the template instance 320—under 30 lines of Ruby source code in this example. The developer can then instantiate and run the live pipeline template to build a deployment pipeline without having to directly specify the best practices, safety mechanisms, deployment stages, etc., needed to build a deployment pipeline.

Figure 5:
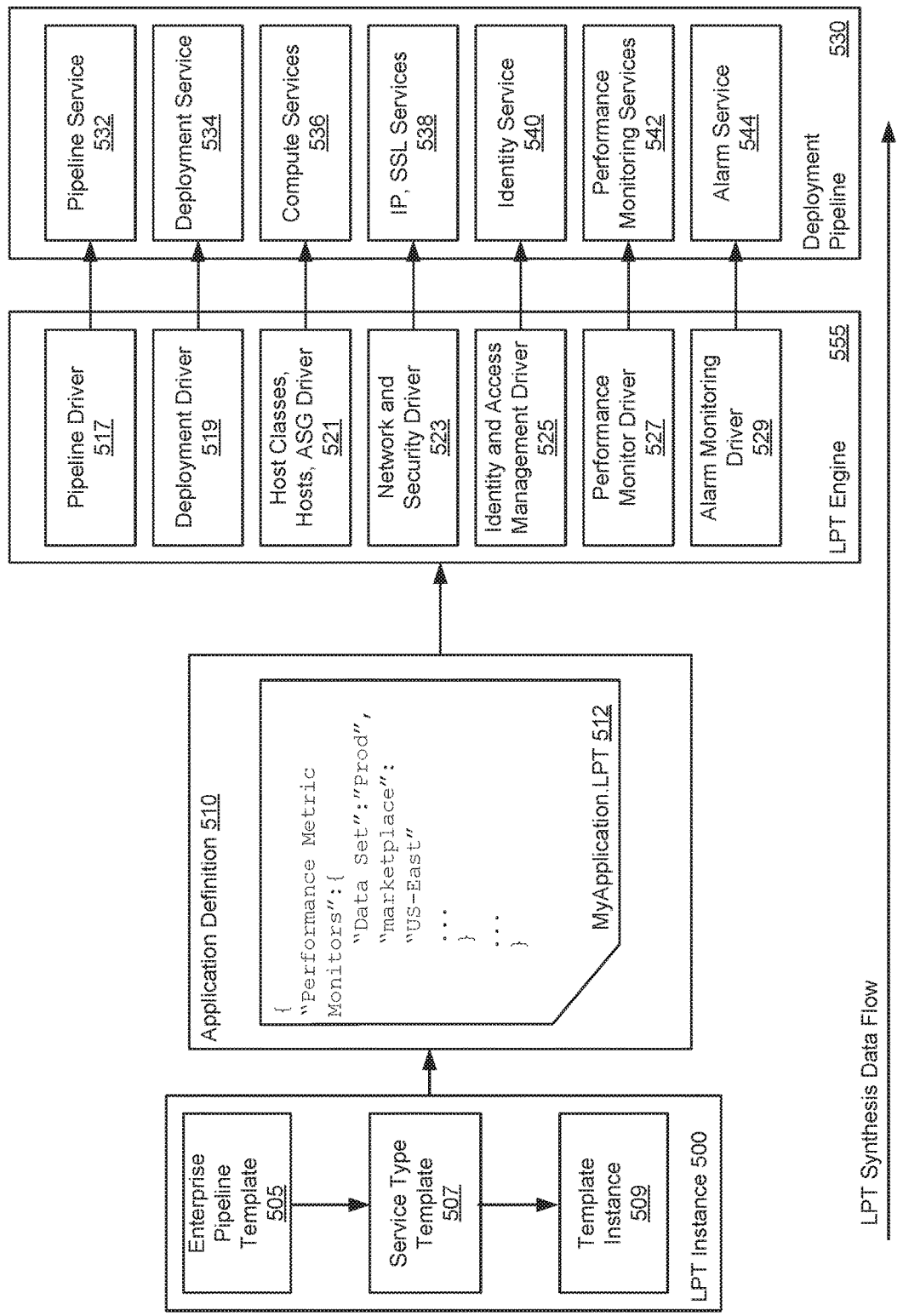
FIG. 5 is a conceptual diagram illustrating data flow for a live pipeline template synthesis process used to configure a deployment pipeline, according to one embodiment.

FIG. 5 is a conceptual diagram illustrating data flow for a live pipeline template synthesis process used to instantiate a deployment pipeline, according to one embodiment. As shown, an LPT instance 500 is built and executed to create an application definition 510. In turn, the LPT engine 555 uses the application definition 510 is used to provision and configure the deployment pipeline 530, according to the application definition 510. That is, during the LPT synthesis process, the LPT engine 555 provisions, configures, launches, or otherwise readies the services and systems needed to bring deployment pipeline 530 into a state where the deployment pipeline 530 can begin deploying a production application.

In this particular example, the LPT instance 500 includes a hierarchy of three pipeline templates—an enterprise pipeline template 505, a service type template 507, and a template instance 509. As noted above, the enterprise pipeline template 505 may capture a base set of best practices and requirements for a deployment pipeline specified at an enterprise level. And the service type template 507 may extend the enterprise pipeline template 505 to include requirements and configuration information for a deployment pipeline used to deploy a service of a specific type (e.g., the request reply service discussed relative to FIG. 4). In turn, the template instance 509 extends the service type template 507 in order to specify details for a specific instance of a deployment pipeline (e.g., the Ruby module 400 discussed relative to FIG. 4). As noted, the enterprise pipeline template 505, service type template 507, and template instance 509 may be represented using source code (e.g., Ruby) and managed under the under control of a revision control system.

Together, the enterprise pipeline template 505, service type template 507, and a template instance 509 form the LPT instance 500. After the template instance 509 is used to inherit from and specialize these base templates as needed for a specific deployment pipeline, the resulting LPT instance 500 is compiled (or otherwise built) and executed to generate the application definition 510. Continuing with an example based on the Ruby programming language, the LPT instance 500 could be passed to the MRI Ruby Interpreter and executed in order to generate the Application definition 510.

In one embodiment, the application definition 510 is defined as a Ruby model that implies a structured document (e.g., a JSON document 512). Formatting the application definition 510 as a structured document 512 provides a description of the deployment pipeline 530 in an interchange format that the various software components of the LPT engine 555 may use to provision and configure deployment pipeline 530 (as well to evaluate the configuration state of a deployed pipeline). The application definition 510 may specify a configuration for a deployment pipeline to be provisioned and instantiated. Further, as described in greater detail below, as the output generated by the LPT engine 555 in evaluating an existing deployment pipeline to learn a current configuration state of that deployment pipeline by querying a set of leaf systems.

In one embodiment, the application definition 510 provides a fully-specified configuration for each leaf system 532-544 included in the deployment pipeline 530, without any unresolved variables, macros, or other external references. Once generated, the application definition 510 may be parsed by a set of LPT synthesis drivers 517-529 included in the LPT engine 555, which can than provision and configure the leaf systems 532-544 included in deployment pipeline 530, according to the application definition.

As shown, the JSON document 512—named "MyApplication.LPT"—illustrates a portion of the configuration for the deployment pipeline 530. In the particular example of FIG. 5, the portion of the application definition 512 includes configuration information for a set of "Performance Metric Monitors" used to monitor the state of virtual machine hosts that are part of a "Production" data set and deployed in a cloud computing region (named "US-East"). Of course, the particular content and structure of the information contained in the JSON document 512 may be tailored depending on the capabilities of the relevant leaf system being described in the application definition and the needs of a particular case.

In one embodiment, the LPT engine 555 includes a set of LPT synthesis drivers 517-529. Each LPT synthesis driver 517-529 may provide a piece of software which corresponds to a particular one of the leaf systems 532-544. Further, each LPT synthesis driver may parse and interpret sections of the application definition 510 that are relevant to the particular LPT synthesis driver (and ignore other sections) to learn the desired configuration of the corresponding leaf system in the deployment pipeline 530. After parsing the application definition 510, each LPT synthesis driver may be configured to identify what elements of the corresponding leaf system exist or have been provisioned and their current configuration state. And once identified, an LPT synthesis driver can determine a set of API calls to invoke against the corresponding leaf system to bring the configuration of that leaf system in line with the application definition 510.

LPT synthesis drivers 517-529 may also declare what other parts of application definition 510 should be enacted before a given LPT synthesis driver can configure a corresponding leaf system. For example, an LPT synthesis driver used to configure an alarm service 544 (i.e., driver 529) which monitors performance metrics and generates alerts could require that a performance monitoring service 542, which generates the performance metrics, be configured and running before the alarm service 544 becomes active.

In the particular example of FIG. 5, the LPT synthesis drivers 517-529 included in the LPT engine 555 comprise a pipeline driver 517, a deployment driver 519, host classes, hosts, and auto-scaling group (ASG) driver 521, a network and security driver 523, an identity and access management (IAM) driver 525, a performance monitor driver 527, and an alarm monitoring driver 529.

In one embodiment, an LPT synthesis driver 517-529 enacts a desired configuration on a corresponding leaf system by passing the leaf system 532-544 a description of a configuration state. In turn, the corresponding leaf system determines what changes are needed in order to enact the desired configuration on that leaf system. That is, the leaf systems 532-544 may be configured to change their respective configuration state in response to messages from the corresponding LPT synthesis driver 517-529. However, an LPT synthesis driver 517-529 could also invoke API calls as needed to directly change configuration states, settings, attributes, parameters, or properties, etc. The pipeline driver 517 may be used to configure a pipeline service 532. In one embodiment, the pipeline service 532 may include systems and services which monitor a source code repository for new versions of an application and begin the process of pushing that application into production through the deployment pipeline 530. Accordingly, the pipeline service 517 could be used to provision VM instances with the appropriate build tools (e.g., compilers, interpreters, etc.), specify the source code repositories, build targets, and installation scripts or tools, along with any other related artifacts needed to build a set of executable software from the source code of a production service. Similarly, the pipeline driver 517 could configure alarms used by the pipeline service 532 to alert a development team about build errors or warnings when creating build targets for a new revision of an application being deployed.

The deployment driver 519 may be used to configure a deployment service 534. In one embodiment, the deployment service 535 may include systems and services which push the build targets created by the pipeline service through a series of test stages and, if successful, into production. Accordingly, the deployment service 534 may configure VM instances which can deploy the build targets into a pre-production test environment and perform any "sandbox" testing specified in the application definition 510. The deployment service may also deploy the build targets onto production servers, e.g., using a one-box test-period followed by a gradual deployment to full production. The deployment driver 519 could also configure the deployment service 534 to react to alarms generated relative to performance metrics provided by the performance monitoring services 542 (as configured by performance monitor driver 527) and alarm services 529 (as configured by alarm driver 527). In such a case, the deployment driver 519 could require that the performance monitoring service 542 and alarm service 544 be provisioned and deployed and active prior to configuring a deployment environment that relies on the performance monitoring service 542 and alarm service 544.

The host classes, hosts, and ASG driver (host driver 521, for short) may be used to configure compute services 536. In one embodiment, the compute services 536 may include the VM instances and related services used by VM instances as part of the production service being deployed. For example, host driver 521 may configure host classes for VM instances used to run the application targets built by the pipeline service 532. For example, host driver 521 could configure a host class "server" which specified characteristics for a VM instance used to host an application server. Once configured, the host driver 521 could access the compute service 536 to launch a pool of VM instances of the "server" host class and deploy them with the application target built by the pipeline service 532 to an environment provisioned by the deployment configuration driver 519. Similarly, the host driver 521 could configure an auto-scaling service (provided as part of compute service 536 in this example) which launched (or removed) VM instances of the "server" host class from the pool based on the demand received by the production service. In such a case, the host driver 521 could require that the performance monitoring service 542 and alarm service 544 be provisioned and configured in order for the auto scaling group is created to manage the hosts deployed to the pool. Host driver 521 could also configure a variety of other compute services needed by the production service being deployed using the deployment pipeline 530, e.g., services such as database services, storage services, messaging services, notification services, workflow services, etc.

The network and security driver 523 may be used to configure network services 538. In one embodiment, the network and security driver 523 may provision data communications networks used by the VM instances launched by the driver 519. For example, the network and security driver 523 could configure virtual IP addresses (VIPs) used to create a network for the VM instances deployed by the host driver 521. To do so, the application definition 510 could specify a configuration for IP addresses, domain name information, switching and routing information, firewall or traffic shaping rules, locations for edge servers or addresses for CDNs, etc. Further, the network and security driver 523 could also provision virtual private networks between VM instances and install security certificates, e.g., SSL certificates on VM instances and applications. Doing so allows the applications of the production service being deployed by the deployment pipeline 530 to communicate with one another (or with client systems) using encrypted channels.

The identity and access management (IAM) driver 525 may be used to configure identity services 540. In one embodiment, the IAM driver 525 may provision user accounts, user names, access control lists, access rules, etc., on the VM instances included in the deployment of a production service, i.e., on the VM instances launched by the host driver 521.

As noted, the performance monitor driver 527 configures the performance monitoring services 543 and the alarm monitoring driver 529 configures alarm services 544. In one embodiment, the monitoring services 543 and alarm services 544 may be used to monitor any measurable aspect of the application, systems, or services being deployed by the deployment pipeline 530, as well as aspects of the deployment pipeline 530 itself. As also noted, other LPT synthesis drivers may rely on the configuration of alarms or values of performance metrics in propagating software applications through the deployment pipeline 530 and into production as well as in monitoring the performance of the production service itself.

Figure 6:
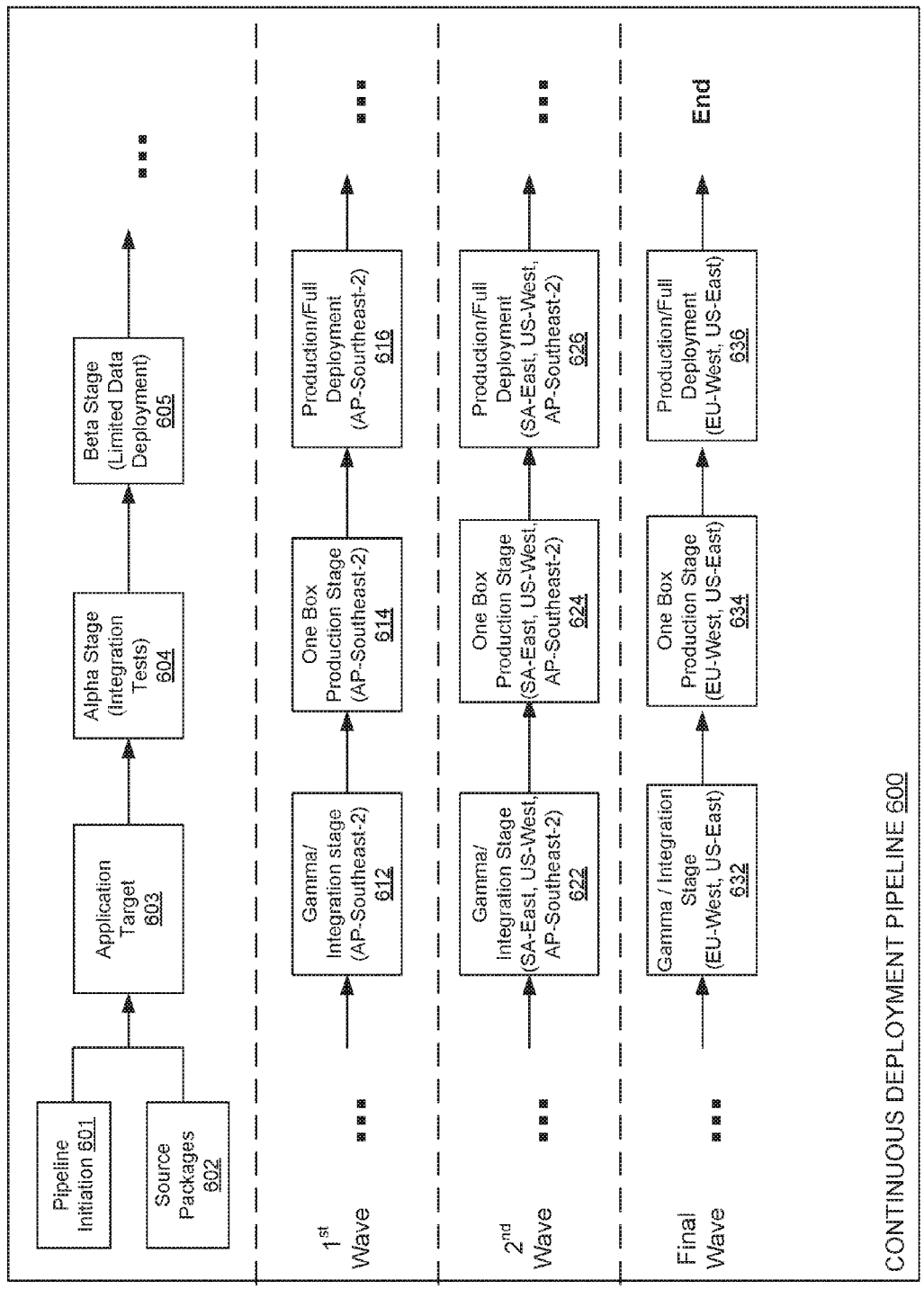
FIG. 6 illustrates an example of a continuous deployment pipeline generated from the application definition and the LPT instance shown in FIG. 5, according to one embodiment.

FIG. 6 illustrates an example of a continuous deployment pipeline generated using the LPT synthesis process using the application definition 510 and the LPT instance package 500 shown in FIG. 5, according to one embodiment. In this example, the deployment pipeline 600 is used to propagate revisions to source code packages 602 through both pre-production test stages (i.e., alpha test stage 604 and beta test stage 605) and through three waves of production test stages which deploy an application target 603 to three groups of cloud computing regions.

Source packages 602 correspond to the source code and any related files (e.g., build files, libraries, image, web, or media content, etc.) needed to build an application target 603. In this example, pipeline initiation 601 represents a setting of whether the continuous deployment pipeline automatically deploys revisions to the source packages 602 (e.g., each new version committed to version control system) or requires a developer to trigger a specific version to be propagated thorough the deployment pipeline 602 and into production. In either case, once triggered, the deployment pipeline retrieves the source packages 602 and builds an application target.

Provided the build of application target 603 from the source package 602 is successful, then deployment pipeline 600 proceeds to an alpha stage test 604. Typically, alpha stage testing is performed to simulate the intended use of the application target using a test framework or harness. Users within the development team may also interact with the application target in a simulated production environment during alpha stage testing. However, as the deployment pipeline 600 is generally used to automate the deployment process, direct user interaction may be omitted in many cases. Alpha stage testing may also include the performance of integration testing to determine whether application target 603 interacts correctly with other, already deployed, systems and/or services that are part of a production service to which the application target 603 is being deployed. If the application target 603 does not pass one of the alpha stage tests 604 (or otherwise fail to meet any combination of threshold requirements specified for alpha stage testing), the deployment pipeline 600 may abort the deployment of application target 603 and provide logging data to the development team. For example, the deployment pipeline 600 may messages to the administrate contact specified in the template instance of a live pipeline template used to build deployment pimple 600.

Provided the application target 603 successfully passes the alpha stage tests 604, then the then deployment pipeline 600 may proceed to beta stage tests 605. Typically, beta stage testing may include. For example, a beta stage test 605 might include a deploy action, which deploys application target 603 to one or more staging servers launched by the deployment pipeline 600. During beta stage testing 605, the performance of the application target 603 running on the staging servers may be monitored and evaluated according to any set of metrics as needed to determine whether the application target operates correctly in the staging environment. As with the alpha stage testing 604, should the application target 604 fail to meet any performance requirements specified for the beta stage testing 605, then the deployment pipeline may abort the deployment abort the deployment of application target 603 and provide logging data to the development team.

Following the pre-production test stages, i.e., following alpha stage tests 604 and beta stage tests 606, the deployment pipeline 600 may begin pushing the application target 603 into increasingly broader production use, until the application target 603 is fully deployed. In the particular example in FIG. 6, the deployment pipeline 600 includes three production deployment waves. In each wave, the application target 603 is pushed into production to a different group of computing regions. Each wave includes a gamma stage testing used to test regional configuration and integration compatibility between the application target 603 and a given cloud computing region before going to regional customer-traffic-taking stages. Following the gamma stage test, each wave includes a one-box stage to detect fatal errors or latency issues. During the one-box stage, a single instance application target is tested in a live providing environment. After being monitored for period of time, the deployment pipeline 600 may proceed to a full production deployment stage, where the application target 603 is rolled out to each server hosting the application target 603 in a given cloud computing region.

Of course, the rate at which the application target 603 is propagated to full production, and the conditions for halting, aborting, or rolling back an ongoing deployment may be specified as part of the live pipeline template used to instantiate the continuous deployment pipeline 600 using the LPT synthesis process discussed above. For example, as noted, the deployment pipeline 600 may include rollback and performance monitors for each production stage, for each region, as well as steady-state alarms on service metrics, and other alarms or service metrics, such as alarms on VIP metrics or JMX metrics, used to monitor the application target as it is deployed into production use. Importantly, however, the developer building deployment pipeline 600 did not need to explicitly specify any of these safety features, rollback conditions, alarms or performance metric thresholds, etc., in building the deployment pipeline 600. Rather, these features are implied by the selection of a live pipeline template to extend with a service-instance template, and automatically generated in the deployment pipeline 600 by the LPT engine during LPT synthesis.

In the example of FIG. 6, the application target 603 is first deployed to a computing region named "AP-Southeast-1" during gamma/integration stage 622. Following this stage, the application target 603 is next deployed in a one box production stage 614 and then a full production deployment stage 616. Provided the application target 603 is fully deployed to the "AP-Southeast-1" computing region, then the deployment pipeline 600 repeats this process during a second deployment wave. Accordingly, the second deployment wave also includes a gamma/integration stage 622, one box production stage 624, and a full production deployment stage 626 used to deploy the application target to three additional cloud computing regions—named "SA-East," "US-West", and "AP-Southeast-2". At each stage of the second wave, performance monitors and alarms (specified in the base template of a live pipeline template) may monitor the deployment of application target 603 in these regions. Note, the deployment pipeline 600 may monitor the application target 603 in each of the "SA-East," "US-West", and "AP-Southeast-2" regions independently. Thus, the application target 603 could end up being successfully propagated to less than all three of these regions. Finally, provided the application target 603 is propagated to one or more of the "SA-East," "US-West", and "AP-Southeast-2" computing regions, then the deployment pipeline 600 proceeds to propagate the application target 603 to two additional computing regions (named "EU-West" and "US-East" in this example) during a final deployment wave. Like the first and second wave, the final deployment wave includes a gamma/integration stage 632, one box production stage 634, and a full production deployment stage 636, in which the deployment pipeline 600 monitors the application target 603 until it is fully deployed into production (or halted due to performance issues).

Note, in this example, the regions for deployment pipeline 600 may have been computed by the LPT engine (rather than explicitly specified) by subtracting the regions explicitly blacklisted in lines 23-25 of the service-instance template shown in FIG. 4 from a master list of computing regions available form a provider. Further, the LPT engine 155 may have ordered the deployment flow for the selected regions automatically by generating deployment waves starting with the computing region which has the lowest traffic first and ending with regions which have the highest traffic (and the remaining regions in the middle deployment wave). Of course, a developer could define methods in the template instance 320 shown in FIG. 4 which explicitly specifies a deployment order flow or even a single computing region.

More generally, one of ordinary skill in the art will recognize that the use of alpha, beta, gamma, one-box, and full deployment stages are included to be illustrative of the types of testing an enterprise could include in a deployment pipeline built from a live pipeline template and used to propagate application target 603 into production. And, in practice, deployment pipeline 600 could be configured with these or other testing stages, however labeled or configured, as needed to suit the requirements in a particular case.

Figure 7:
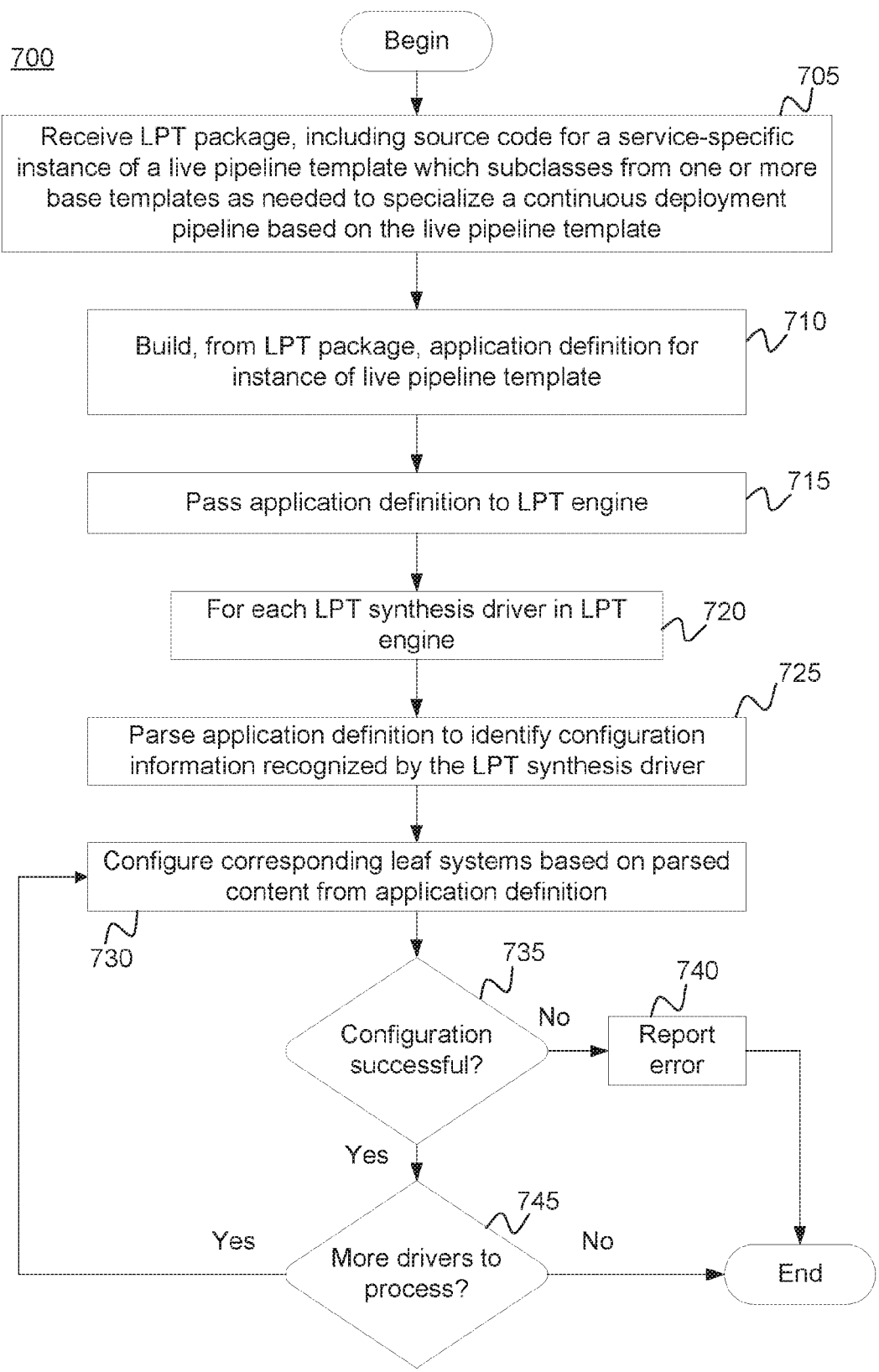
FIG. 7 illustrates a method for creating, from a live pipeline template, a deployment pipeline used to deploy a production computing service, according to one embodiment.

FIG. 7 illustrates a method 700 for creating, from a live pipeline template, a deployment pipeline used to deploy and update a production computing service, according to one embodiment. As shown, the method 700 begins at step 705 where the live pipeline template engine receives an LPT package. The LPT package may include the source code for a service specific instance of a live pipeline template which subclasses a hierarchy of one or more base pipeline templates. The service specific instance may extend and/or override the one or more base templates as needed to specify a limited number of service-instance specific details for a continuous deployment pipeline. The one or more base pipeline templates may capture a set of best practices, safety features, rollback conditions, alarms or performance metric thresholds to use to deploy an application or component of a production service of a given service type.

At step 710, the appropriate build tools may build an application target of the LPT package. Using the Ruby module 400 listed in FIG. 4 as an example, the LPT package could be executed using the MM Ruby interpreter in order to write the content of an application definition to a file. As noted, the application definition may provide a fully-specified configuration for a deployment pipeline, without any unresolved variables, external references, or macros. The application definition may be formatted in a structured interchange format (e.g., a JSON formatted document).

At step 715, the resulting application definition may be passed to the LPT engine, which uses a collection of LPT synthesis drivers included in the LPT engine to provision, launch, configure, or otherwise ready a system or service component of a deployment pipeline according to the application definition. At step 725, the LPT synthesis drivers parse the application definition to identify one or more sections of the application definition that are relevant to a given LPT synthesis driver.

At step 730, each of the LPT synthesis drivers may determine whether any requirements for configuring the leaf system corresponding to a given LPT synthesis driver are satisfied. For example, a deployment driver used to configure a deployment service may rely on monitoring and alarm services being configured before building the pre-production test stages and production test stages of a deployment environment. Similarly, an auto-scaling service used to provide an auto-scaling group may require a host class configuration for VM instances to use in the auto-scaling group be available prior to configuring the auto scaling group. More generally, each LPT synthesis driver may declare what other parts of the application definition need to be enacted before they are triggered to configure an element of the deployment pipeline specified in the application definition.

Once any requirements for a given LPT synthesis driver have been satisfied, then that driver may configure a corresponding leaf system component of the deployment pipeline specified in the application definition. At step 735, if a given LPT synthesis driver is unsuccessful in configuring the corresponding leaf system component, then at step 740, the LPT engine reports an error and halts the LPT synthesis process from continuing to configure leaf system components of the deployment pipeline. Of course, log data or other messages could be captured and sent to a development team indicating which the LPT synthesis driver was unable to configure a corresponding leaf system according to the application definition and what errors occurred. Otherwise, if successfully configured, then at step 745, the LPT engine determines whether more LPT synthesis drivers need to configure leaf system components of the pipeline. If so, the method 700 returns to step 730 where additional leaf system components are configured. This process may generally repeat until an error occurs or the deployment pipeline is fully configured and ready to use to deploy a production service.

Figure 8:
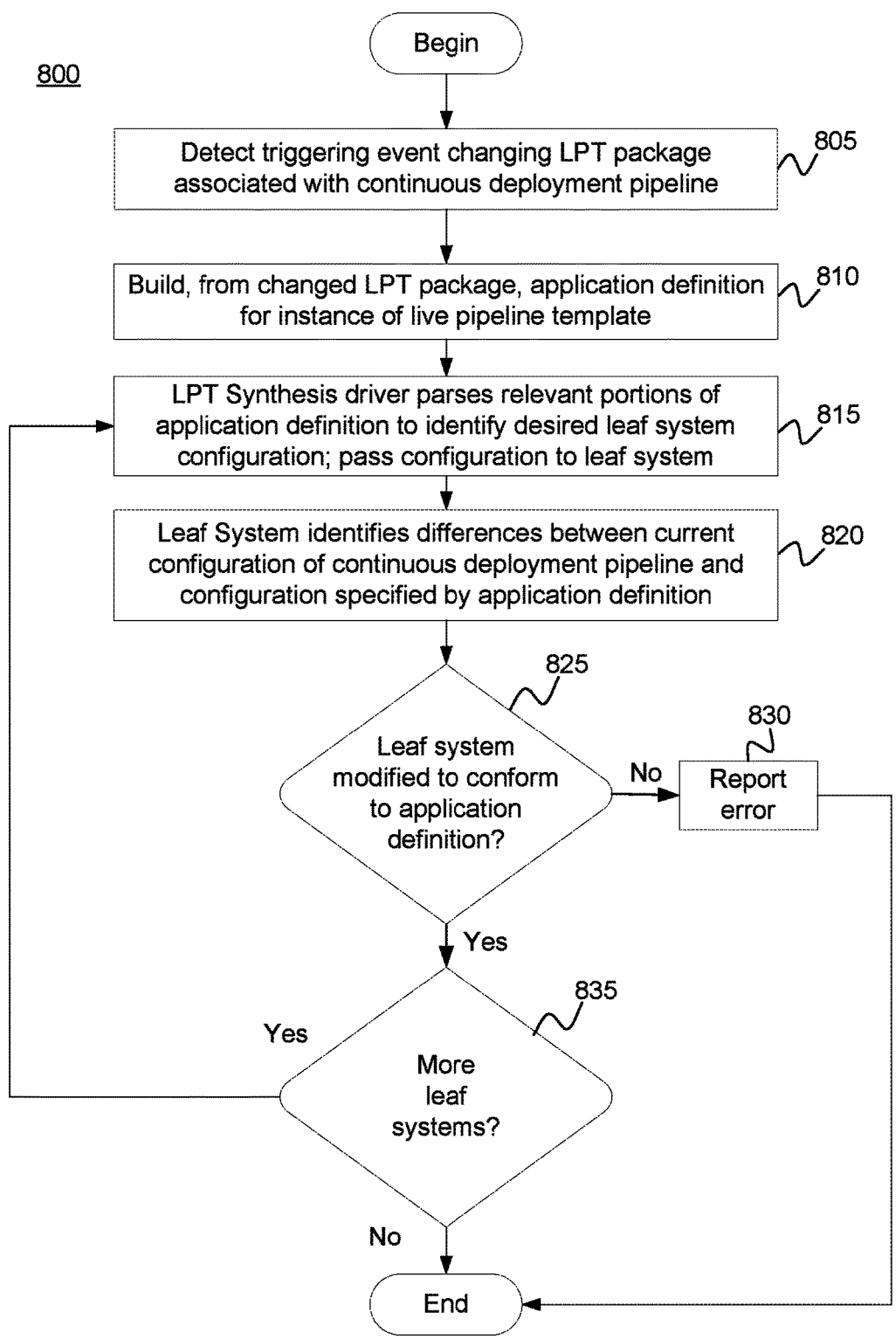
FIG. 8 illustrates a method for a meta-pipeline to modify a deployment pipeline, itself used to deploy a production computing service based on changes to a live pipeline template, according to one embodiment.

Once deployed, e.g., according to the method 700 of FIG. 7, the resulting continuous deployment pipeline may itself be the deployment target of a meta-pipeline. As noted, the meta-pipeline may be used to propagate changes made to the live pipeline template into the continuous deployment pipeline. In other words, the meta-pipeline is separate from the actions of the deployment pipeline being used to propagate changes to applications or other components of a production service. FIG. 8 illustrates a method 800 for a meta-pipeline to modify a deployment pipeline, itself used to deploy a production computing service based on changes to a live pipeline template, according to one embodiment.

As shown, the method 800 begins at step 805, where the meta-pipeline (or component of the LPT engine) detects a triggering event changing the record version of an LPT package associated with a continuous deployment pipeline. In one embodiment, the LPT engine may monitor for changes to the source code of a live pipeline template being committed to a deploy-version branch within a version control system.

For example, as the best practices or preferences for a deployment pipeline evolve within an enterprise or business unit change, a development team may update the source code of the enterprise base template. As another example, the source code of the enterprise base template could be updated to take advantage of new services or new features of existing services as they become available within the cloud computing regions hosting a production service. As additional examples, aspects of more specific templates in the live pipeline hierarchy could be changed, such as a dev/ops team template adding additional contact information or changes in the service-specific template made to override additional methods in the base class template or remove a blacklisted region from the service-specific template. This latter example could result in an entirely new instance of the systems and services used to provide a continuous deployment pipeline being provisioned and launched in a new computing region.

What changes to the LPT instance or to the underlying hierarchy of templates should trigger a change to be propagated out to the continuous deployment pipeline, via the meta-pipeline, may be tailored as a matter of preference in a particular case. Further, in addition to changes to a live pipeline template triggering an update to a deployment pipeline, changes in the cloud computing environment could result in the meta-pipeline being used to modify a deployment pipeline. For example, if new cloud computing regions becomes available, or if certain services needed for the deployment pipeline are provisioned and launched in an existing cloud computing region, then the meta-pipeline could be used to provision and launch a systems and services for new continuous deployment pipeline in such computing regions. Of course, a developer could also manually activate the meta-pipeline to propagate changes in a live pipeline template into production use.

Referring again to FIG. 8, at step 810, the LPT engine is used to build an updated application definition from the updated source code of the live pipeline template. At step 815, a loop begins where one (or more) of the LPT synthesis drivers parse the updated application definition to identify sections specifying a desired configuration state for a corresponding leaf system (or systems). As noted, some LPT synthesis drivers may have dependencies on others. On each pass through the loop beginning step 815, LPT synthesis drivers which do not have any unmet dependency requirements may be used to update the configuration state of the corresponding leaf systems based on the updated application definition.

At step 820, an LPT synthesis driver may pass the desired configuration state to the corresponding leaf system. In turn, the leaf system may determine whether the changes can be made or the configuration state passed from the LPT synthesis driver can be enacted on the leaf system (step 825). For example, each leaf system may identify differences between a current configuration of that leaf system and a desired state requested by the corresponding LPT synthesis driver. If a configuration state of a given leaf system cannot be modified or enacted as requested by the LPT synthesis driver, then at step 830, the corresponding LPT synthesis driver reports an error and any changes made to that leaf system (or made to others as part of an update) may be rolled back to the previous configuration state. Of course, log data or other messages could be captured and sent to a development team indicating how the updated application definition conflicts with the current deployment pipeline or describe why the deployment pipeline cannot be updated.

Otherwise, at step 835, if more leaf systems need to be processed, the method returns to step 815, where one (or more) of the LPT synthesis drivers continue to enact the application definition on the corresponding leaf system (or systems) until the deployment pipeline is fully updated (or an error occurs disrupting the update).

Figure 9:
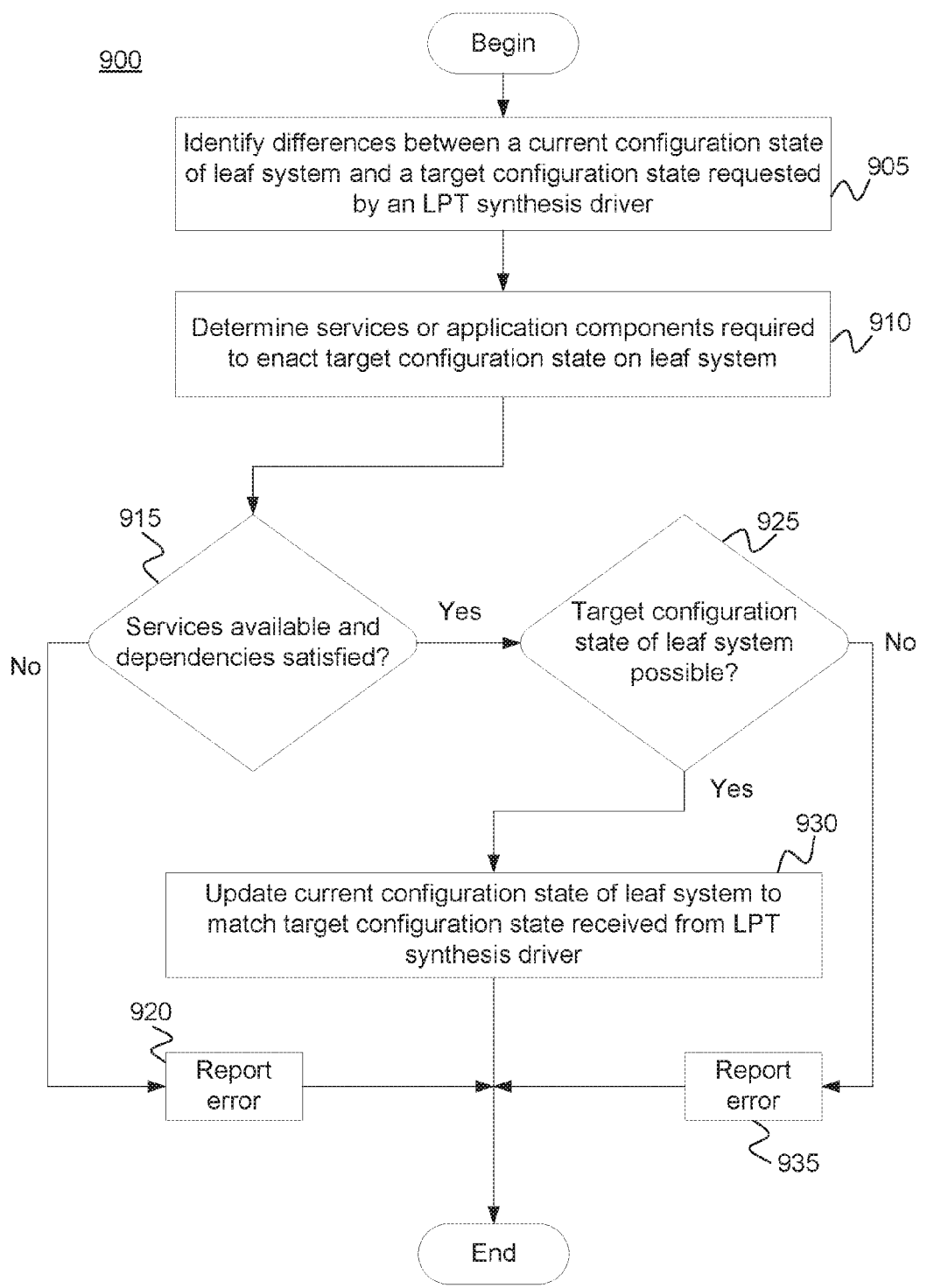
FIG. 9 illustrates a method for determining whether changes to a live pipeline template can be propagated to the leaf systems of a continuous deployment pipeline, according to one embodiment.

FIG. 9 illustrates a method 900 for determining whether changes to a live pipeline template can be propagated to the leaf systems of a continuous deployment pipeline, according to one embodiment. Method 900 generally illustrates steps that may be performed as part of step 835 of method 800 of FIG. 8. As shown, the method 900 begins at step 905, where a leaf system identifies differences between a current configuration state and a target configuration state requested by an LPT synthesis driver.

At step 910, a leaf system may determine what other services, application components, or service dependencies may be required by the target configuration state. That is, the leaf system determines what dependencies need to be satisfied in order to enact the target configuration state on that leaf system.

At step 915, the leaf system may determine whether the systems or services identified at step 910 are available, configured, or otherwise meet any requirements of the leaf system. For example, an update to the live pipeline template may specify a configuration for a first leaf system that requires other leaf systems or services which are not available to the first leaf system. In other cases, a given leaf system could determine that the updated application definition references features of the given leaf system that have not been deployed to a given hosting region.

The leaf system may also determine whether any service dependencies required by that leaf system are satisfied. For example, a leaf system in one region could require the availability of other services not explicitly referenced by the application definition which were unavailable from that region. For example, a network security service used to provision and configured security certificates on public facing sever systems while deploying an application via the deployment pipeline may have a dependency requiring access to a certificate authority which issues digital certificates signing public keys generated by the network security service. As another example, a pipeline service used to may have dependencies related to the availability of a source code repository, version control system, and available build tools in the cloud computing region in which the pipeline service is hosted.

If any services or dependencies specified by the updated application definition are not available, or any unresolved dependency issues are identified, then the leaf system may report an error to the LPT synthesis driver (step 920). Otherwise, meaning all dependencies are satisfied, step 925, the leaf system may determine whether the updated configuration state of the leaf system is realizable (step 920). That is, the leaf system may also validate any parameters, attributes, or other aspects of the target configuration state, based on the operational capabilities that leaf systems. If any configuration conflicts or invalid configuration settings are found, then the leaf system may report an error to the LPT synthesis driver (step 935). Otherwise, at step 930, the leaf system updates the current configuration state of that leaf system to match the target configuration state received from the LPT synthesis driver. Once enacted, the leaf system may report to the corresponding LPT synthesis deriver that the update has been completed.

Figure 10:
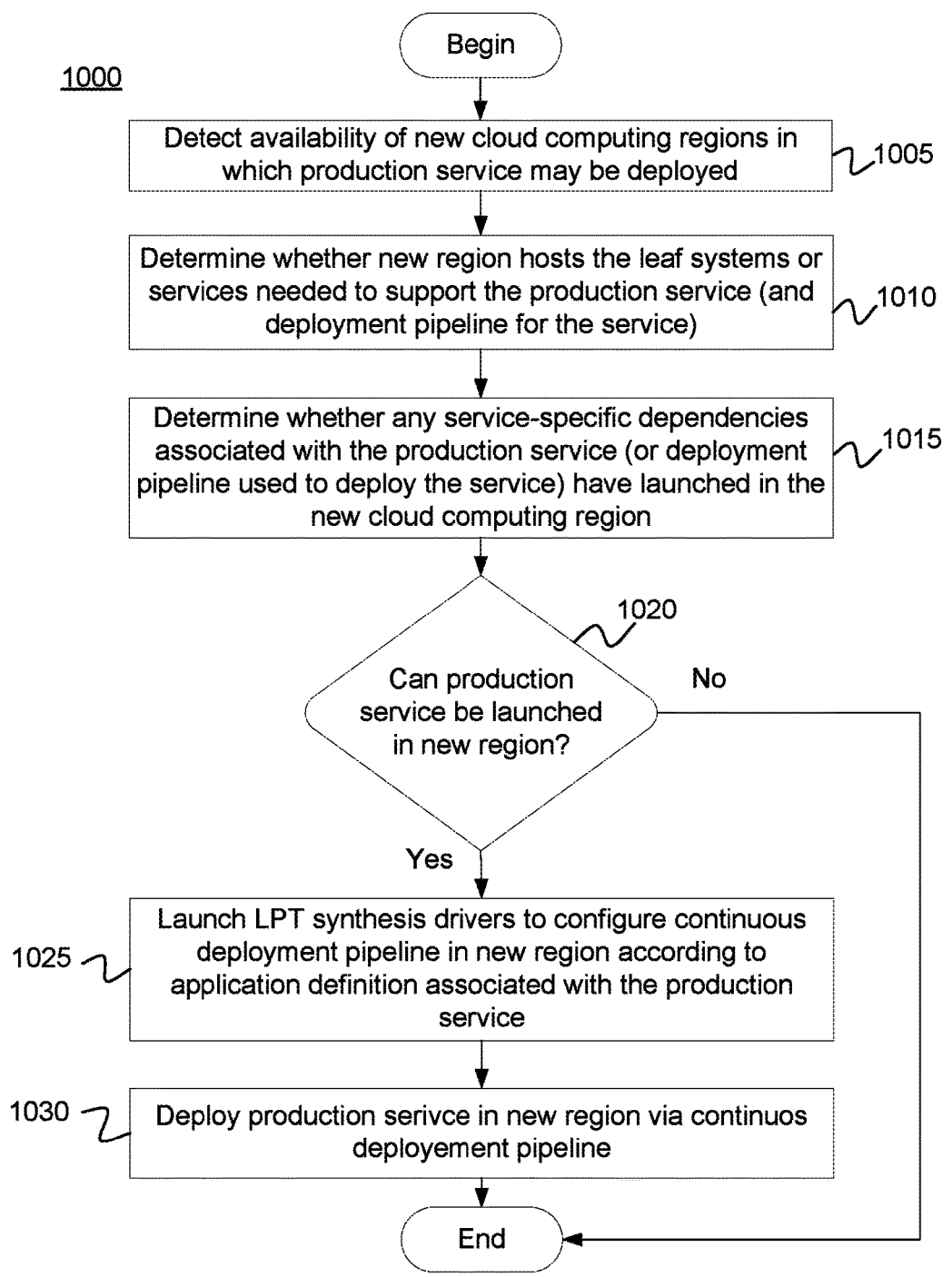
FIG. 10 illustrates a method for automatically configuring and deploying a deployment pipeline in newly available cloud computing region based on an existing live pipeline template, according to one embodiment.

FIG. 10 illustrates a method 1000 for automatically configuring and deploying a systems and services for deployment pipeline based on an existing live pipeline template in newly available cloud computing region, according to one embodiment.

As illustrated in the Ruby module 400 of FIG. 4, in one embodiment, a developer may specify a set of computing regions to exclude from the LPT synthesis process in launching a deployment pipeline. And thus, blocking the production service deployed via that pipeline from being launched in that same set of computing regions. If a developer removes one of the cloud computing regions from this set, or in cases where new cloud computing regions are provisioned by the provider, then the method 1000 may be triggered to configure a deployment pipeline used to deploy the underlying production service in such cloud computing regions.

As shown, the method 1000 begins at step 1005 where the LPT engine (or meta-pipeline) detects the presence of a new cloud computing region in which a production service is available to be deployed using a continuous deployment pipeline. Such a pipeline may be modeled using an LPT instance corresponding to a live pipeline template. At step 1010, the LPT engine determines whether the new region hosts the leaf systems or services needed to support the production service. In addition, the LPT engine may determine whether the new cloud computing region hosts the leaf systems and services need by the deployment pipeline. That is, the LPT engine confirms that the leaf system components of a deployment pipeline referenced by an applications definition are available in the new cloud computing region.

At step 1015, the LPT determines whether any service dependencies associated with the production service are available in a new cloud computing region. In addition, the LPT engine may determine whether any service dependencies associated with the leaf systems or services required to build and launch the deployment pipeline are available in the new cloud computing region. That is, in addition to confirming the leaf systems and services explicitly referenced in the application definition are available (step 1010) the LPT engine confirms that any dependencies associated with such leaf systems and services are available in the new cloud computing region for both a production service and a deployment pipeline used to deploy that production service.

At step 1020, the LPT engine tests, based steps 1010 and 1015, whether the leaf systems and services (and service dependencies) for both the deployment pipeline and the underlying production service are available from the new cloud computing region. If not, then the method 1000 ends, as the new computing service does not satisfy either the requirements of the deployment pipeline or underlying production service (or both). Of course, log data or other messages could be generated and sent to a dev/ops team indicating the availability of the new cloud computing region. Such messages could indicate what leaf system, service, or dependencies thereof, were not satisfied and, therefore, prevented a live pipeline template from being used to launch a deployment pipeline in the new cloud computing region.

Figure 11:
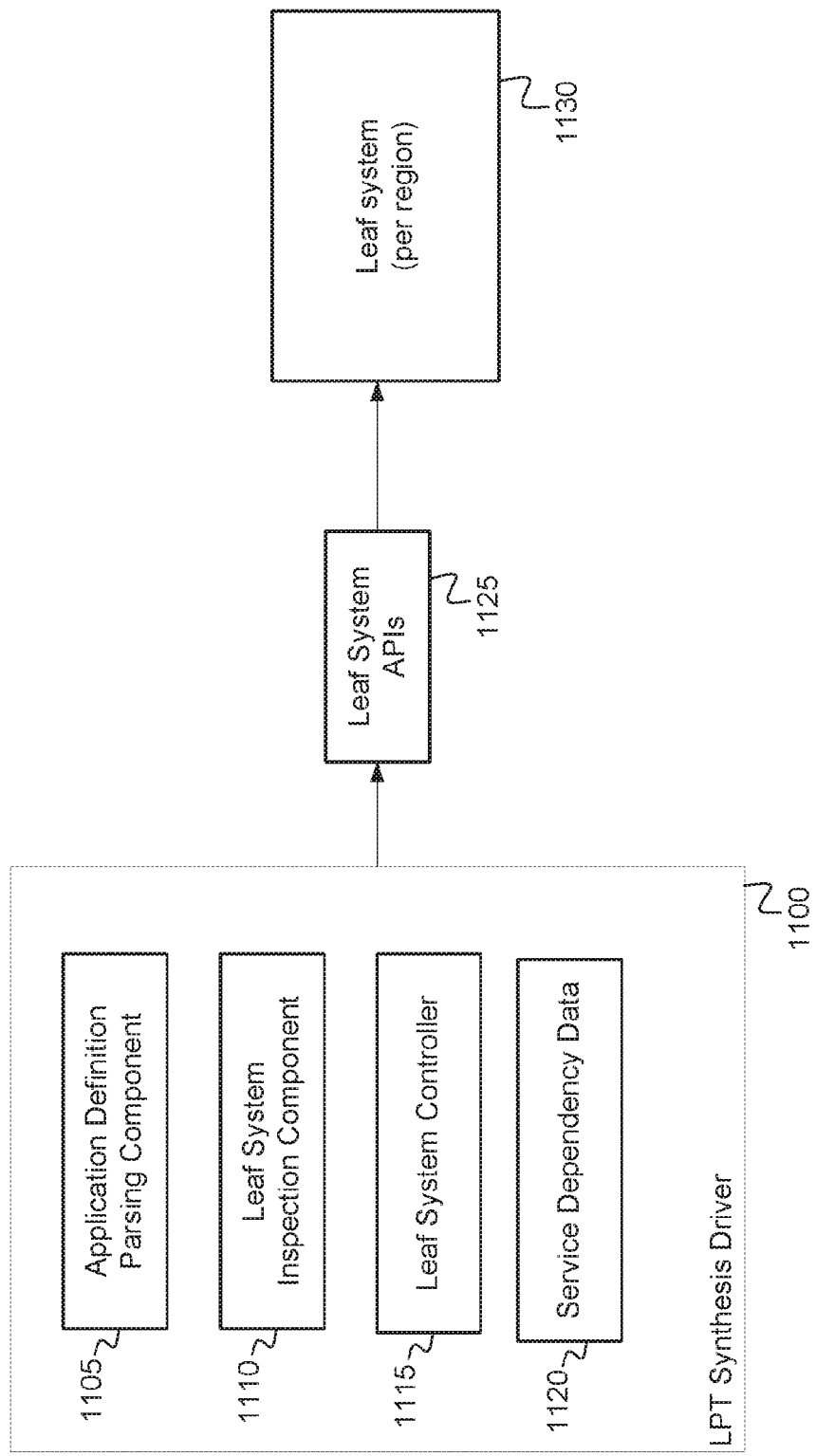
FIG. 11 illustrates an example of components of leaf system drivers used to configure, deploy, and inspect computing resources as part of deploying a production service, according to one embodiment.

FIG. 11 illustrates an example of components of a LPT synthesis driver 1100 used to configure, deploy, and inspect computing resources in a leaf system 1130 used as part of deploying a production service, according to one embodiment. As shown, the LPT synthesis driver 1100 includes an application definition parsing component 1105, a leaf system inspection component 1110, a leaf system controller 1115, and a set of service dependency data 1120.

The application definition parsing component 1105 provides a software element of the LPT synthesis driver 1100 used to identify relevant sections of an application definition. Given an application definition, the parsing component 1105 interprets the sections describing the configuration the leaf system 1130 corresponding to the LPT synthesis driver 1100 and ignorers other sections of the application definition. For example, for an application definition built as a JSON document, the parsing component can search the JSON document for key values recognized by the parsing component 1105. Once identified, the parsing component 1105 can extract the desired configuration for leaf system 1130 from the JSON elements associated with the recognized key values. For example, assume the leaf system 1130 corresponds to a deployment service hosted by a cloud computing provider. In such a case, the parsing component 1105 could identify JSON elements describing the desired deployment stages in a deployment pipeline, such as the three waves of gamma, one box, and production stages for the low traffic, high traffic, and middle traffic cloud computing regions shown in FIG. 6.

The leaf system inspection component 1110 provides a software element of the LPT synthesis driver 1100 which can access the leaf system 1130 and identify a current configuration state, parameters, operational state, performance metrics or characteristics, or other relevant attributes or properties of the leaf system 1130. The leaf system inspection component 1110 may be used during an LPT analysis process described below. In one embodiment, the leaf system inspection component 1110 may invoke API calls exposed by leaf system APIs 1125 to access, query, or inspect the leaf system 1130. Continuing with the example of a deployment service, the leaf system inspection component 1110 could invoke leaf system APIs 1125 to identify what stages are present in a deployment pipeline, conditions for success or failure at each stage, what monitoring alarms, rollback conditions, or performance monitors are in place for each stage, etc.

The leaf system controller 1115 provides a software element of the LPT synthesis driver 1100 which can request the leaf system 1130 modify the configuration or operational state of the leaf system 1130 as needed to enact a target configuration parsed from the application definition by component 1105. To do so, the leaf system controller 1115 may invoke API calls 1125 to pass the target configuration state of the leaf system 1130.

Continuing with the example of a deployment service, the leaf system controller 1130 could request that the deployment service modify a production deployment stage to have a lower threshold for rolling back a deployment based on a performance measure (e.g., the average latency of a response to client requests). Such a modification could be in response to a change in the best practices of captured in an enterprise base template used in building the LPT instance for a deployment pipeline. In such a case, a meta-pipeline pipeline could identify such a change (via the parsing component 1105), pass the changed configuration to the leaf system 1130 (via the controller component 1110 and APIs 1125), and confirm that changes have been enacted.

Service dependency data 1120 identifies what leaf systems in a deployment pipeline should be configured and available prior to the leaf system driver 1110 inspecting or configuring leaf system 1130. That is, service dependency data 1120 identifies what leaf systems, other than leaf system 1130, in a deployment pipeline need to be fully configured prior to leaf system 1130 itself being configured. Again continuing with the example of a deployment service, the service dependency data could indicate that any alarms or performance monitors needed by each deployment stage of a deployment pipeline configured via the deployment service prior to the leaf system driver accessing or modifying the leaf system 1130.

In addition to the LPT synthesis process described above, the LPT engine may also perform an LPT analysis process in order to evaluate the configuration of a deployment pipeline for a given production application or service, regardless of whether that application or service was deployed using a live pipeline template or using the LPT synthesis process described above. Further, while described above as an LPT synthesis driver, in one embodiment, the LPT synthesis driver may include the leaf system inspection component 1110 to provide the function of an LPT analysis driver described in detail below. Accordingly, while the LPT synthesis drivers and LPT analysis drivers are described herein separately for convenience, the LPT synthesis drivers and LPT analysis drivers discussed herein may be implemented as an integrated LPT synthesis and analysis driver.

Figure 12:
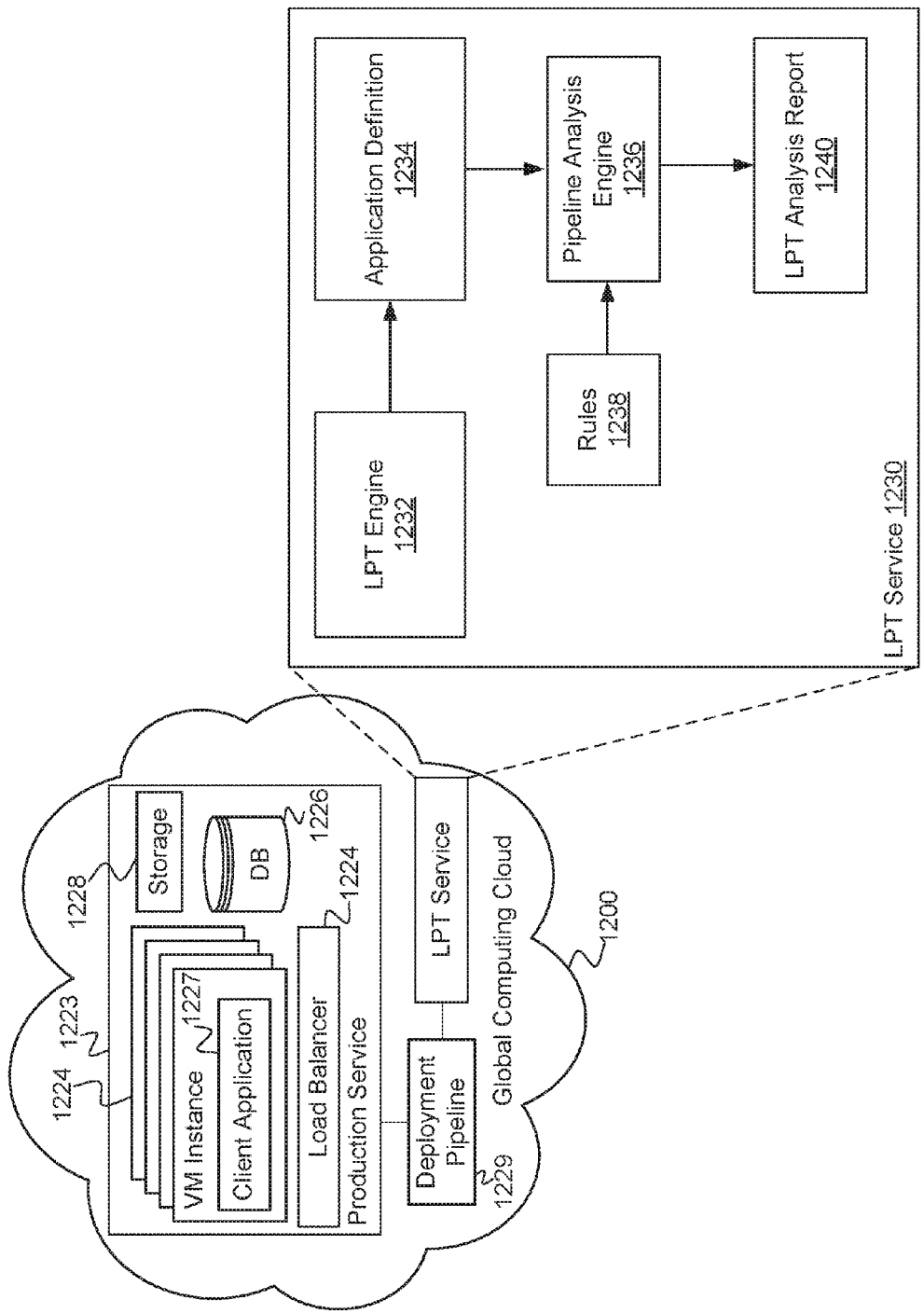
FIG. 12 is a conceptual diagram illustrating a live pipeline template analysis process used to evaluate the configuration of a deployed computing service, according to one embodiment.

FIG. 12 is a conceptual diagram illustrating components of an LPT service 1220 performing an LPT analysis process used to evaluate the configuration of a deployment pipeline 1229, itself used to deploy and update a production computing service 1223, according to one embodiment. As shown, the production service 1223 is hosted in a global computing cloud 1200. The production service 1223 itself includes a collection of VM instances 1224 hosting a client application 1227. The production service 1223 also includes a load balancer 1225, storage services 1228, and database services 1226. For example, the production service 1223 could provide a retail website, as described relative to FIG. 1. Further, instances of the systems and services used to provide the production service 1223 cloud deployed in multiple cloud computing regions of the global computing cloud 1200, e.g., production service 125 in region 120, a production service 135 in region 130 and a production service 145 in region 140 all shown in FIG. 1.

In this example, the production service 1223 may be deployed and updated using deployment pipeline 1229. The deployment pipeline 1229 may include a suite of services and systems available within the global computing cloud 1200 used to configure, provision, and launch the computing services 1224-1228 within global computing cloud 1200. In addition, as a development team updates the client application 1227 or updates a desired configuration for the computing services 1224-1228, the deployment pipeline 1229 may propagate such changes out to the production service 1223.

For this example, assume a developer manually configured and deployed the systems and services used by the deployment pipeline 1229. In such a case, the deployment pipeline 1229 may lack some of the best practices, safety mechanisms, deployment stages, rollback capabilities, etc., preferred by an enterprise or business unit managing the production service 1223—or may simply be incomplete or configured incorrectly.

In one embodiment, the LPT service 1220 hosted in the global computing cloud 1200 may be configured to inspect the deployment pipeline 1229 to identify any discrepancies between a preferred configuration for deployment pipeline 1229 and the actual configuration state of deployment pipeline 1229. As shown, the LPT service 1230 includes the LPT engine 1232, application definition 1234, pipeline analysis engine 1236, rules 1238 and LPT analysis report 1240. In one embodiment, the LPT engine 1232 may generate a "ground truth" application definition 1234 describing the deployment pipeline 1229 according to the same structured interchange format used for the LPT synthesis process, e.g., a JSON formatted document.

Further, the LPT service 1230 may include a collection of LPT analysis drivers, (e.g., the LPT synthesis 1100 driver of FIG. 11 with the inspection component 1110). In one embodiment, each LPT analysis driver is used to access a service or system itself used as part of the deployment pipeline 1229 and to determine a current configuration state of that service or system. Based on the current configuration, the LPT analysis driver may generate a portion of the application definition 1234 formatted according to the interchange format. Once each LPT analysis driver has evaluated the deployment pipeline 1229, the resulting application definition 1234 may be passed to the pipeline analysis engine 1236.

In turn, the pipeline analysis 1236 may evaluate the application definition 1234 against a set of rules 1238. The rules 1238 may be used to capture the best practices or configuration requirements for a deployment pipeline. That is, the rules 1238 may be used to ensure that deployment pipeline 1229 follows the best practices established by an enterprise for deployment pipelines. Some of the rules 1238 could be applied to all deployment pipelines used by an enterprise to deploy and maintain production services, while other rules could be specific to a given service type.

In one embodiment, rules 1238 could be modeled on aspects of a deployment pipeline specified by enterprise base template 305. Similarly, rules 1238 for a particular service type could be modeled on aspects of the service-type template 310 (both discussed above relative to FIG. 3). For example, an enterprise-wide rule 1238 could specify that each deployment pipeline must include gamma and one-box testing stages as part of every production deployment stage. Similarly, another rule 1238 could require that an auto-rollback monitor be configured for the one box and production stages in the deployment pipeline. In this latter case, a service-specific one of the rule 1238 could be used to specify the minimum performance thresholds that should be applied to production systems before triggering the rollback mechanisms and interrupting a deployment that fails to satisfy the minimum performance thresholds. Of course, one of skill in the art will recognize that the substance of the rules 1238 may be tailored based on the needs and practices of an enterprise, the services available to construct a deployment pipeline, the types of services deployed by a deployment pipeline, and the circumstances of a particular case, etc.

After evaluating the application definition 1234, the pipeline analysis 1236 may generate an LPT analysis report 1240. The LPT analysis report 1240 may provide an indication of the current configuration of the deployment pipeline 1229 (based on the "ground truth" application definition 1234) along with an indication of which rules 1238 the deployed pipeline 1229 satisfied or failed. In addition to surfacing any criticism of the deployment pipeline, such as rule violations or warnings about the configuration state of the deployment pipeline 1229, the LPT analysis report 1240 may also specify what actions or changes to the configuration of deployment pipeline 1230 should be made to correct a given rule violation. For example, the LPT analysis report 1240 could recommend changes to the number, order, or type of testing stages in a deployment pipeline, the configuration and values for rollback monitors, alarms on performance metrics, the types of systems and services included in the deployment pipeline, etc.

Further, in one embodiment, the LPT service 1230 could provide a "one-click fix" for rule violations found in the deployment pipeline 1226. In such a case, the LPT analysis report 1240 could specify a corrective action relative to a given rule violation. Upon request from a developer, the LPT service 1230 could then modify portions of the "ground truth" application definition 1234 (or modify source code of the underlying live pipeline template) to remedy a rule violation identified in the LPT Analysis report 1240. In response, the LPT service 1230 could use the LPT synthesis process described above to propagate changes in the modified application definition 1234 (or changes in the underling LPT instance) to the deployment pipeline 1229.

In another embodiment, the pipeline analysis 1236 could compare the "ground truth" application definition with another application definition and generate an LPT analysis report 1250 reflecting any discrepancies or differences. For example, a developer could select a service-type live pipeline template that matches or is compatible with a service type associated with the production service 1223, In response, the pipeline analysis 1236 could compare an application definition generated using this live pipeline template with the "ground truth" application definition 1234. In another case, the "ground truth" application definition 1234 could be compared with an application definition used to build deployment pipeline 1234. Doing so could identify changes made directly to a deployment pipeline 1229 that conflict with an LPT instance and corresponding application definition used to build deployment pipeline 1229. In either case, the LPT analysis report 1234 could be generated to identify any discrepancies in the configurations represented by the application definitions as potential issues to address and correct in the deployment pipeline 1229.

Further, in one embodiment, the LPT analysis report could also recommend a live pipeline template to specialize and use with the deployment pipeline 1229. Doing so would allow a development team to bring deployment pipeline 1229 under source code control of the LPT synthesis process and to begin maintaining the configuration of deployment pipeline 1229 using a meta-pipeline. For example, the pipeline analysis 1236 could compare the "ground truth" application definition 1234 with application definitions built from different LPT template instances or modeled on the higher-level base or service-type templates. Depending on the similarities between application definitions, the pipeline analysis 1236 could include a recommendation in the LPT analysis report 1240 of a live pipeline template that most closely matches or is otherwise compatible with the "ground truth" configuration of the deployment pipeline 1229.

Figure 13:
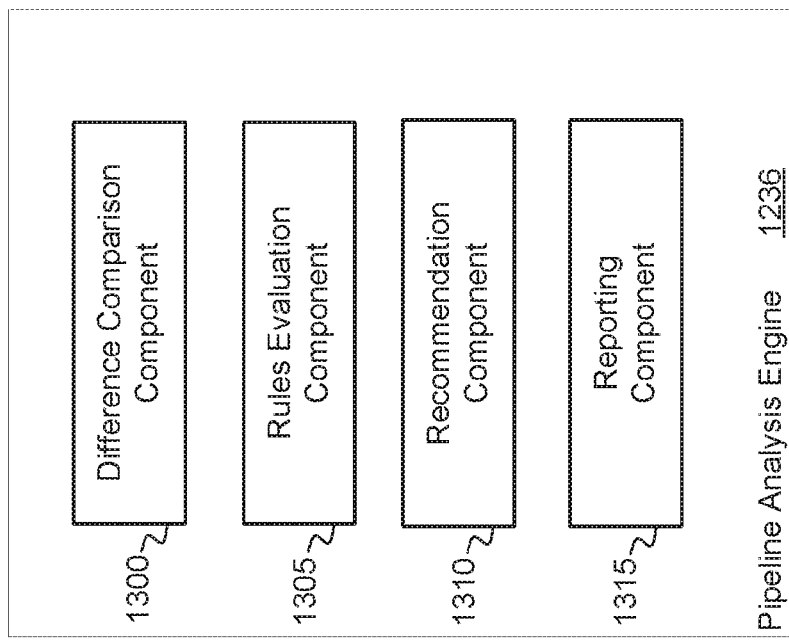
FIG. 13 illustrates components of a pipeline analysis engine used to perform live pipeline template analysis, according to one embodiment.

FIG. 13 illustrates components of the pipeline analysis 1236 used to perform the LPT analysis process, according to one embodiment. As shown, the pipeline analysis 1236 includes a difference comparison component 1300, a rules evaluation component 1305, a recommendation component 1310, and a reporting component 1315. The components 1300-1315 generally provide software elements of the pipeline analysis 1236 used to evaluate and report on the configuration state of deployment pipeline 1229.

The difference comparison component 1300 provides a software element of the pipeline analysis 1236 configured to compare one application definition with another and identify differences in the deployment pipelines represented by application definitions being compared. For example, the difference comparison component 1300 may compare the structured content for a given leaf system in different application definitions and generate a report describing any differences in the configuration of the given leaf system. The process may be repeated for each leaf system component in deployment pipeline 1229. As noted, doing so could allow a development team to understand what changes to an operational deployment pipeline need to occur in order to bring the operational deployment pipeline under control of a live pipeline template. In other cases, the comparison could be used to identify changes made directly to a deployment pipeline initially configured using the LPT synthesis process. In still other cases the difference comparison component 1300 could compare multiple potential deployment pipelines built from candidate pipeline templates with an actual deployment pipeline to help identify candidate pipeline templates should be used to bring the actual deployment pipeline under source code control.

The rules evaluation component 1305 provides a software element of the pipeline analysis 1236 which can determine whether an application definition satisfies a set of one or more rules. In one embodiment, the application definition evaluated by the component 1305 could represent the "ground truth" state of an actual deployment pipeline. Doing so could allow a dev/ops team to understand how well an in-use deployment pipeline follows a set of best practices or guidelines. Similarly, the rules evaluation component could assist a dev/ops team in diagnosing a deployment pipeline that does not operate as intended. In another case, rules evaluation component 1305 could evaluate an application definition build from a LPT instance that has net been used to construct a deployment pipeline. Doing so could help a developer understand whether a candidate pipeline template satisfies any best practices or operational requirements reflected in the set of rules.

The rules recommendation component 1310 provides a software element of the pipeline analysis 1236 which can assist a development team in modifying elements of deployment that do not satisfy a given rule. As noted, the recommendation could suggest changes to a deployed pipeline to bring it into compliance with enterprise practices or to address issues in a deployment pipeline that is not functioning correctly. Further, the LPT service could allow a developer to implement changes suggested by the recommendation component 1310 upon request.

In another case, the results of the evaluation component could be integrated with an approval workflow associated with a deployment pipeline being manually configured. In such a case, the approval workflow could block a deployment pipeline based on a customizable severity level of any rule violations identified by the pipeline analysis 1236.

The reporting component 1315 provides a software element generally configured to build reports from the information generated by the difference comparison component 1300, rules evaluation component 1305, and recommendation component 1310. For example, FIG. 14 illustrates an example interface 1400 presenting an LPT analysis report for a continuous deployment pipeline, according to one embodiment. As shown, the interface 1400 includes a collection of panels used to present information generated by the reporting component 1315 of the pipeline analysis. As shown, the interface 1400 includes a service data panel 1405 indicating the relevant deployment pipeline, the associated production service, and the LPT instance evaluated using the pipeline analysis. In this example, the service data is modeled on the source code of a LPT instance show in FIG. 4.

A risk report panel 1410 shows a set of results generated by the evaluation component 1305 in assessing the actual configuration of the deployment pipeline identified in panel 1405. In this particular example, the risk report indicates that a deployment pipeline in the US-East computing region is missing a rollback monitor for a production stage and that a deployment pipeline in the US-West computing region is missing a gamma stage test in in one of two availability zones in the US-West computing region. A severity panel 1415 indicates that the missing rollback monitor in the US-East computing region presents a more severe risk to the production service in this region than the missing gamma stage test in one of two availability zones in the US-West computing region. A correction panel 1415 shows a recommended fix is available for each of the two risks identified by the pipeline analysis 1326. In this particular example, the recommended fix is simply to add the missing components, i.e., to add the missing rollback monitor to the deployment pipeline in the US-East region and to add the missing gamma stage to the relevant availably zone in the US-West region. In addition, the interface 1400 includes a "click2fix" panel which allows a developer to apply the recommended correction to these deployment pipelines. If used, the LPT synthesis techniques discussed above may be used to automatically correct the rule violations identified by the pipeline analysis 1326.

In addition to the risk report 1410, which may present risks associated with rules that are not satisfied by a deployment pipeline, the difference report panel 1430 is used to show the results of a difference comparison of between two application definitions. As shown, the actual instance of the deployment pipeline in the US-East region has been compared with the LPT instance to build this deployment pipeline. Further, in this example, the actual configuration matches the one specified by the LPT instance. A change comparison button 1435 may be used to select what deployed pipelines, application definitions, or LPT instances are compared to generate the difference report 1430.

Figure 15:
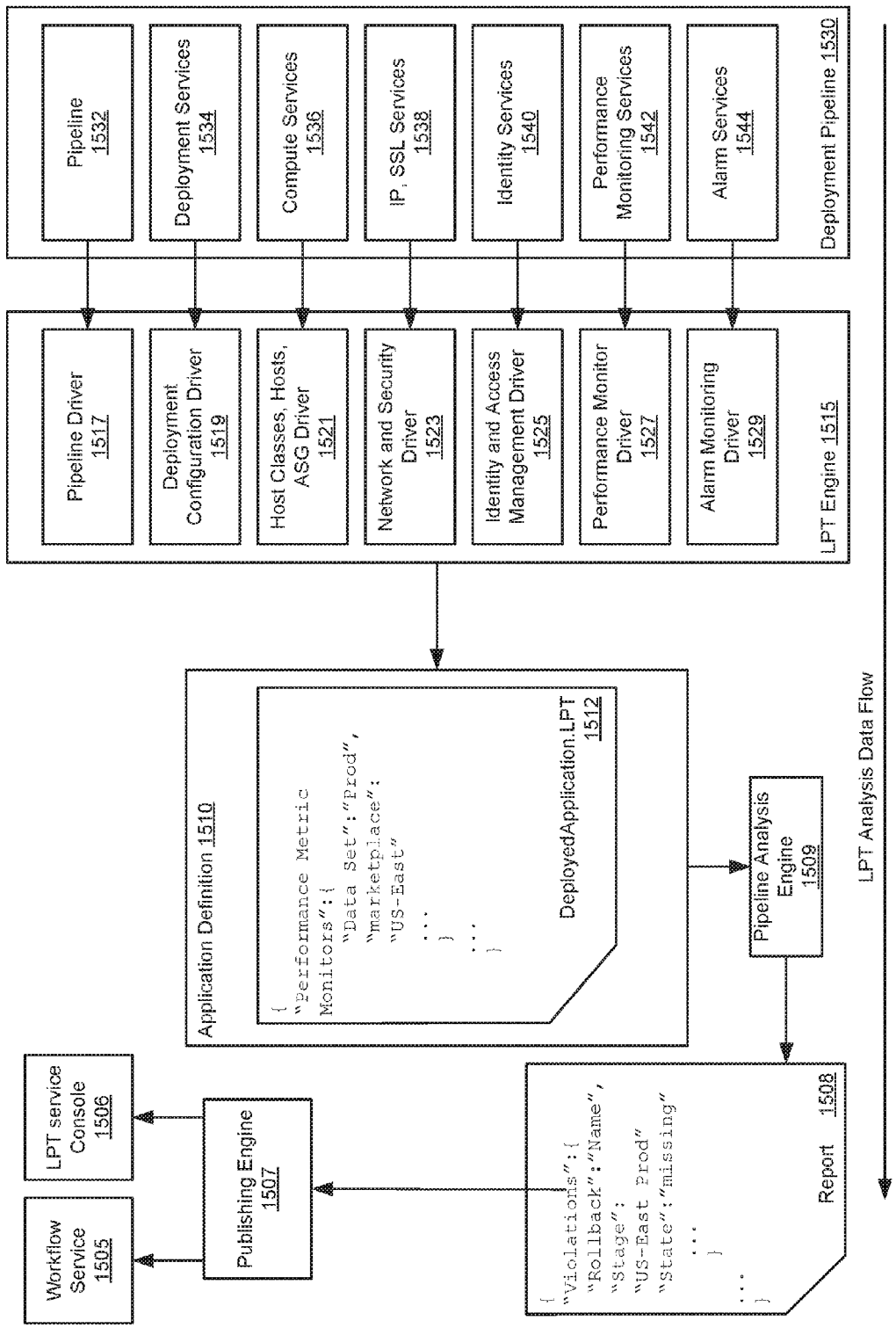
FIG. 15 is a conceptual diagram illustrating data flow for an LPT analysis process analysis used to evaluate a deployment pipeline used to deploy a production computing service, according to one embodiment.

FIG. 15 is a conceptual diagram illustrating data flow for live pipeline template analysis used to evaluate a deployment pipeline used to deploy a production computing service, according to one embodiment. As shown, an LPT engine 1515 is used to inspect an as-deployed configuration of a deployment pipeline 1530. The LPT engine 1515 uses the as-deployed configuration to compose an application definition 1510 describing the as-deployed configuration. In turn, the pipeline analysis engine 1509 may evaluate the application definition 1510 representing the as-deployed configuration against a set of rules as well as compare the application definition 1510 to others. That is, during the LPT analysis process, the LPT engine 1515 accesses and inspects the services and systems included as part deployment pipeline 1530 in order to build a comprehensive model reflecting the actual configuration state of the deployment pipeline 1530. And once determined, the resulting application definition 1510 may be evaluated using a variety of approaches to identify strengths, weaknesses, or other qualitative or quantitative metrics about the configuration state of the deployment pipeline 1530.

In one embodiment, like the application definition 510 generated during the LPT synthesis process illustrated in FIG. 5, the application definition 1510 generated during the LPT analysis process illustrated in FIG. 15 may be defined as a Ruby model that implies a structured document (e.g., a JSON document 1512). Formatting the application definition 1510 using the same interchange format used by the LPT synthesis process ensures that the software components of the LPT engine 1515 and pipeline analysis engine 1509 may process an application definition, whether generated using either the LPT synthesis process or LPT analysis process, without having to perform any translations or transformations.

The JSON document 1512—named "DeployedApplication.LPT"—illustrates a portion of the application definition derived from the deployment pipeline 1530 by the LPT analysis drivers 1517-1529. In the particular example of FIG. 15, the portion of the application definition 1512 includes configuration information for a set of "Performance Metric Monitors" used to monitor the state of virtual machine hosts that are part of a "Production" data set and deployed in a cloud computing region (named "US-East"). Of course, the particular content and structure of the information contained in the JSON document 1512 may be tailored depending on the capabilities of the relevant leaf system being described in the application definition and the needs of a particular case.

As noted, the output of the LPT engine 1515 provides a "ground truth" application definition 1510 for deployment pipeline 1530 based on the configuration state of the leaf systems included in deployment pipeline 1530. In this particular example, the deployment pipeline 1530 includes seven underlying leaf systems 1532-1544, each which has a separate configuration to be modeled in the application definition 1510. In one embodiment, the LPT engine 1515 includes a Ruby in-memory workflow performed to generate the application definition 1510 by triggering the LPT analysis drivers 1517-1529 to query the corresponding services leaf systems 1532-1544. The steps of the workflow may be configured such that each step declares which parts of the application definition 1510 the workflow expects to be complete before a given LPT analysis driver 1517-1529 starts running. For example, a deployment configuration driver 1519 that generates deployment environment information to include in the application definition 1510 may expect that the pipeline driver 1517 has inspected the pipeline service 1532 and contributed to the application definition 1510 before running. This may be the case as the pipeline configuration may be how the driver 1519 identifies what deployment environments to access in the deployment service 1534. In one embodiment, a dependency resolver of the LPT engine 1515 selects which LPT analysis drivers to run until all of the leaf systems 1530 have been fully inspected.

In one embodiment, the LPT engine 555 includes a set of LPT analysis drivers 1517-1529. Each LPT analysis driver 517-529 may provide a piece of software which corresponds to a particular one of the leaf systems 1532-1544. Further, each LPT analysis driver 1517-1529 may access a corresponding leaf system 1532-1544 in deployment pipeline

1530 and inspect a configuration of that leaf system. Based on the inspection, the leaf system drivers 1532-1544 compose sections of the application definition 1510 that are relevant to the particular LPT analysis driver (and ignore other sections) to build a complete description of the deployment pipeline 530.

In the particular example of FIG. 15, the LPT analysis drivers 1517-1529 included in the LPT engine 1515 comprise a pipeline driver 1517, a deployment driver 1519, host classes, hosts, and auto-scaling group (ASG) driver 1521, a network and security driver 1523, an identity and access management (IAM) driver 1525, a performance monitor driver 1527, and an alarm monitoring driver 1529.

The pipeline driver 1517 may determine a configuration of a pipeline service 1532 used to monitor a source code repository for new versions of an application and begin the process of pushing that application into production through the deployment pipeline 1530. The deployment driver 1519 may determine a configuration of the deployment service 534. For example, the deployment driver 1519 may identify the as-deployed configuration for a series of test stages used to propagate an application into a production environment.

The host classes, hosts, and ASG driver (host driver 1521, for short) may be used to determine a configuration of a compute service 1536 used by the deployment pipeline 1530. For example, the host driver 1521 may determine a configuration of VM instances, scaling groups, host classes used by the deployment pipeline 1530 (or used by production service deployed by the deployment pipeline 1530). Host driver 1521 could also determine a configuration for a variety of other compute services 1536 used by the deployment pipeline 1530 (or corresponding production service), e.g., services such as database services, storage services, messaging services, notification services, workflow services, etc.

The network and security driver 1523 may be used to determine a network configuration of network services deployed via the deployment pipeline 1530, such as IP and SSL services 1538. For example, the network and security driver 1523 could identify a configuration of IP addresses, domain name information, switching and routing information, firewall or traffic shaping rules, locations for edge servers or addresses for CDNs, etc. used by the deployment pipeline 1530. Further, the network and security driver 1523 could identify what security certificates, e.g., SSL certificates have been deployed on VM instances and applications deployed by the deployment pipeline 1530. The identity and access management (IAM) driver 1525 may be used to determine a configuration of identity services 1540 provisioned on the deployment pipeline 1530, e.g., a configuration of user accounts, user names, access control lists, access rules, etc., on the VM instances granting users with access to the deployment pipeline 1530.

The performance monitor driver 1527 may be used to determine a configuration of what performance monitors have been configured for the deployment pipeline 1530. For example, the performance monitor driver 1527 may identify what metrics are measured during each pre-production and production testing stage deployed by the deployment service 1534. Similarly, the alarm monitoring deriver 1529 may determine a configuration of what performance alarms and thresholds are configured in the deployment pipeline 1530 based on the performance metrics configured by the performance monitor deriver 1527.

As shown, the application definition 1510 may be passed to the pipeline analysis engine 1509, which may generate a report document 1508 listing any rule violations or differences between the application definition 1510 and another. In this particular example, the report 1508 is also composed using an interchange format (e.g., JSON), allowing it to be consumed by a publishing engine 1507. In turn, the publishing engine 1507 may push (or post messages read by) a workflow service 1505 and an LPT service console 1506. As shown, the report 1508 describes a rule violation related to a "missing" rollback monitor in a production test stage within the US-East region.

In one embodiment, the publishing engine 1507 may be a service hosted by the cloud computing provider. Such a service which allows other systems to subscribe to receive messages or alerts about a given topic. In the present context, the publishing engine 1507 may provide the report 1508 to the LPT service console 1506, which could generate an interface presenting the report to a developer (e.g., the interface 1400 of FIG. 14). The workflow service 1505 could be configured to process reports published by the publishing engine 1507 for a collection of deployment pipeline automatically and send messages regarding the overall "health" of the deployment pipeline used by an enterprise. Of course, other systems and services could consume the report 1508 published by the publishing engine 1507. For example, in one embodiment, violations included in the report 1508 could be scheduled to be corrected by the LPT engine using the LPT synthesis process automatically (or routed to a dev/ops team for review and approval).

Note, while illustrated separately in FIGS. 5 and 15, the LPT synthesis drivers 517-1529 shown in FIG. 5 may integrated with the LPT analysis drivers 1517-1529 shown in FIG. 15 as combined LPT leaf system drivers that provide the functionality for both the LPT synthesis processes and the LPT analysis process described above.

Figure 16:
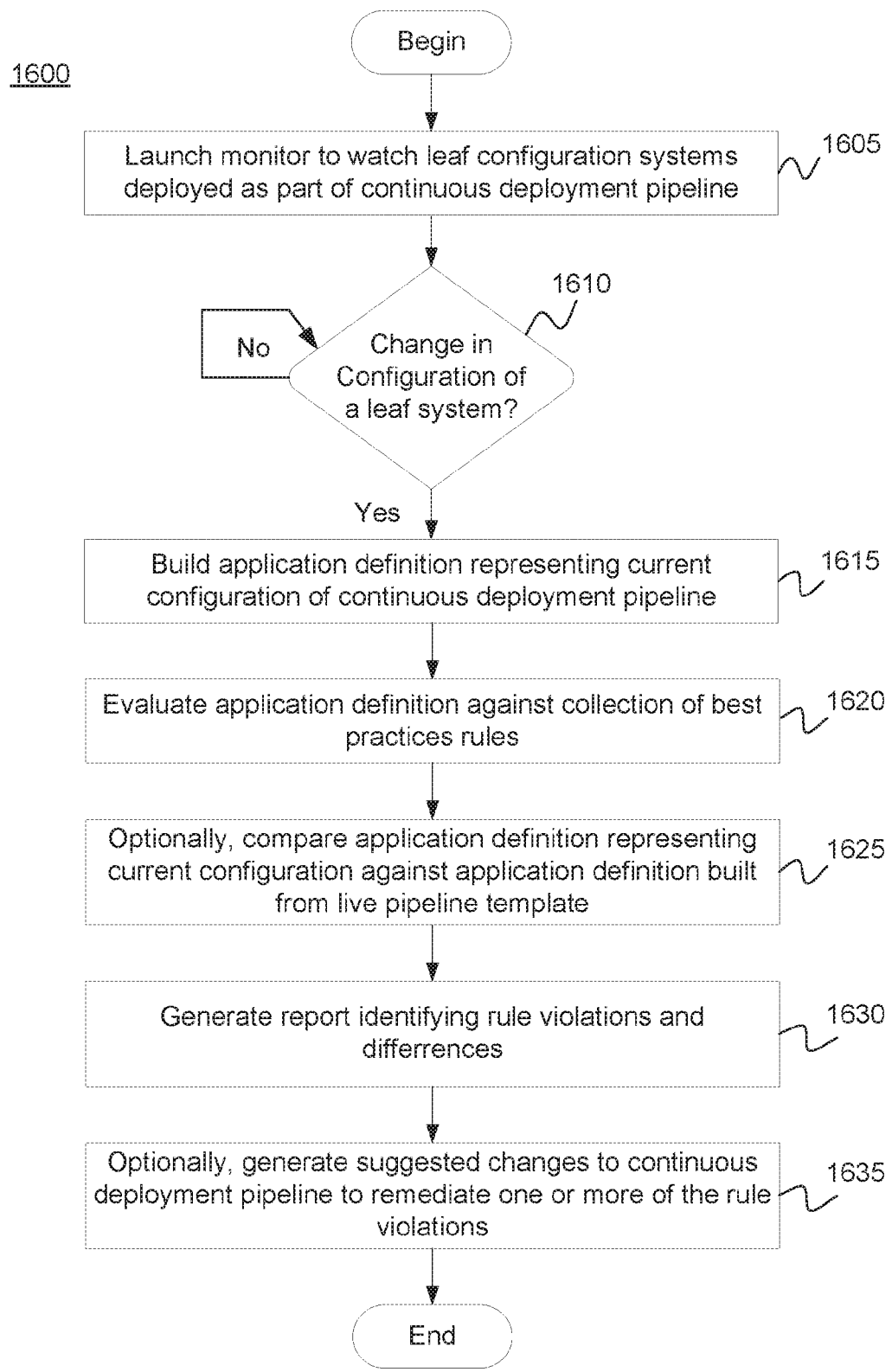
FIG. 16 illustrates a method for monitoring a deployment pipeline using the LPT analysis process, according to one embodiment.

In one embodiment, the LPT analysis process described above may be used to monitor and alert on changes made to a deployment pipeline, or to inspect the configuration of a deployment pipeline either on demand or periodically. For example, FIG. 16 illustrates a method 1600 for monitoring a deployment pipeline using the LPT analysis process, according to one embodiment. As shown, the method 1600 begins where a developer instantiates a monitor used to watch a continuous deployment pipelines referenced by the monitor. For example, once deployed using a live pipeline template, a developer could configure a monitoring service to detect any changes made to the leaf systems included in the deployment pipeline. In other cases, the pipeline analysis engine could be configured to periodically perform a batch process to identify and evaluate a then-current configuration of one or more deployment pipelines.

At step 1610, the monitor observes the deployment pipeline until detecting a change in one of the monitored leaf systems. Once the configuration of one of the leaf system is changed, then at step 1615, the LPT engine may build an application definition representing a current configuration of the deployment pipeline. In other cases, the LPT engine could build an application definition for a given deployment pipeline on-demand for a developer or periodically (e.g., in the absence of a request to modify the pipeline or a monitor observing the pipeline or as part of a review of all deployment pipelines for a given service type).

At step 1620, the resulting application definition may be evaluated using a set of rules reflecting the best practices or operational requirements for a continuous deployment pipeline. As noted, the rules may specify if-then conditional statements based on the configured leaf systems in the deployment pipeline or specify general requirements for a deployment pipeline. As step 1625, the LPT engine may compare the application definition generated at step 1615 with another application definition, such as one generated from a live pipeline template used to construct the deployment pipeline under consideration prior to the detected change.

At step 1630, the pipeline analysis engine may generate a report specifying any rule violations identified at step 1620 or differences between the current configuration of the deployment pipeline and a reference configuration generated for the deployment pipeline. As noted, the report may be generated in an interchange format consumed by a publishing service (or other systems). At step 1635, the pipeline analysis engine may generate suggestions for changes to the deployment pipeline to address a rule violation identified at step 1620. Alternatively, the pipeline analysis engine could be configured to automatically reconfigure computing services of the deployment pipeline to address any rule violations (or send a request to administrator to approve a set of modifications to the deployment pipeline).

In still other embodiments, the reconfiguration may occur to enforce a configuration state of a given deployment pipeline automatically, regardless of any rule violations. That is, the pipeline analysis engine may be configured to automatically revert changes made to the computing services included in a given deployment pipeline. For example, after detecting a change in one of the computing services used to provide a deployment pipeline (i.e., a change in one of the leaf systems), the pipeline analysis engine could build an application definition from an LPT instance used to provide an authoritative configuration for that deployment pipeline. Once built, LPT synthesis drivers could be invoked to reconfigure the computing service according to the fully-specified configuration provided in the application definition.

Figure 17:
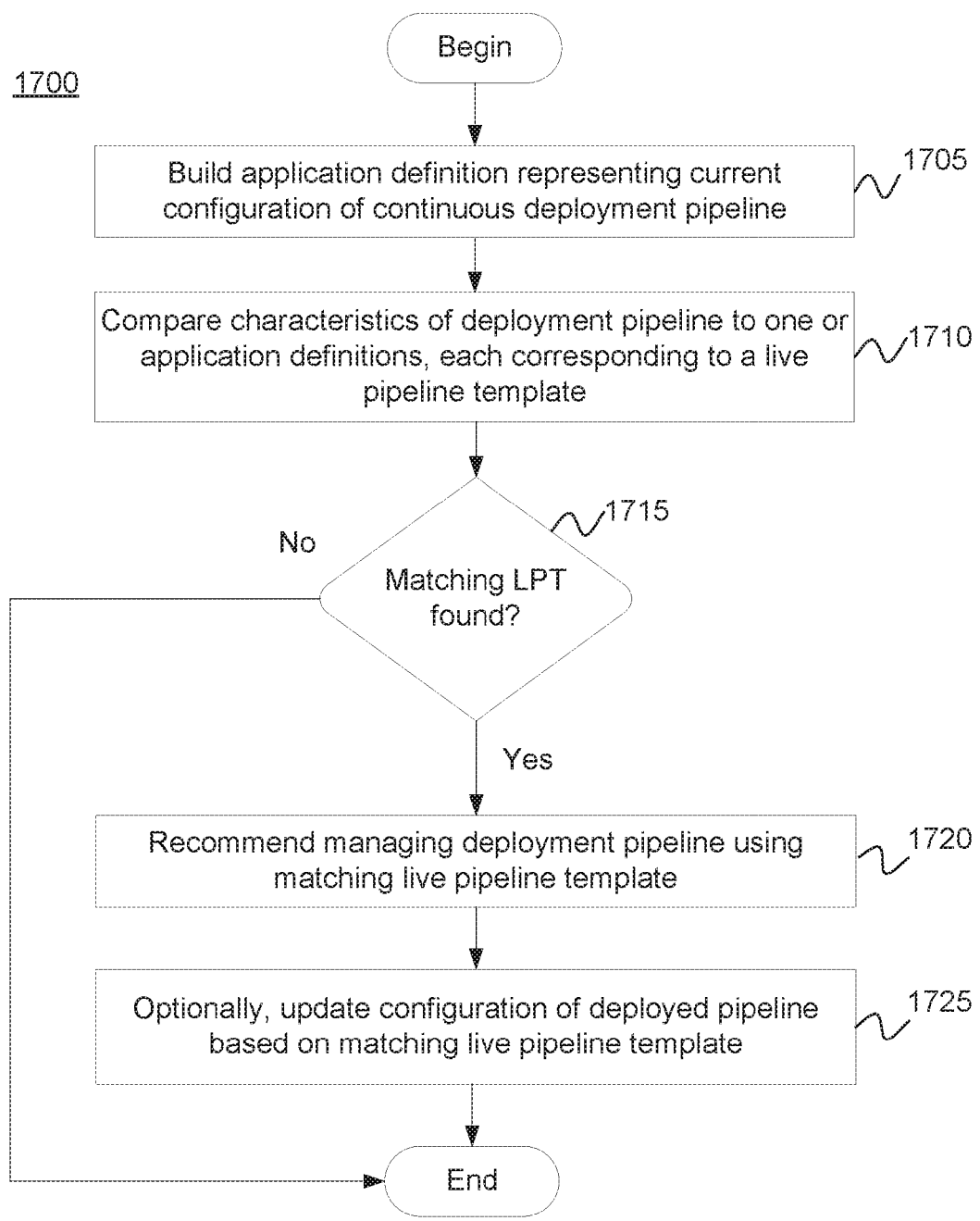
FIG. 17 illustrates a method for bringing the configuration and deployment of a continuous delivery pipeline for an existing computing service under control of a live pipeline template, according to one embodiment.

FIG. 17 illustrates a method 1700 for bringing the configuration and deployment of a continuous delivery pipeline under control of a live pipeline template, according to one embodiment. As shown, the method 1700 begins at step 1705, where the LPT engine builds an application definition corresponding to the continuous delivery pipeline. For example, the LPT engine may build an application definition for a deployment pipeline manually configured and deployed by a developer.

At step 1710, the LPT engine may compare the characteristics of the deployment pipeline under consideration, as reflected in the application definition generated at step 1705, to other application definitions. Each of the other application definitions used in the comparison may correspond to a live pipeline template which can be specialized with generic instance specific parameters to provide an LPT instance for the deployment pipeline under consideration. In other cases, LPT instances that have been fully specialized and used to build a deployment pipeline may be included in the comparison performed at step 1710. In one embodiment, the results of the comparison may indicate a measure of similarity or compatibility between the application definition generated from of the deployment pipeline under consideration and a given one of the other application definitions. In other cases, a developer could specify matching criteria used to determine a matching score or compatibility for a comparison between the application definition generated from the deployment pipeline under consideration and the other application definitions.

At step 1715, if the LPT engine identifies a compatible live pipeline template, then at step 1720, the LPT engine may recommend the deployment pipeline under consideration be managed using the compatible live pipeline template. For example, a developer may specify matching criteria evaluated at step 175 to identify a compatible live pipeline template (e.g., a match for a pipeline line for a give service type or for a pipeline having certain stages, alarms or deployment processes). At step 1725, if the matching live pipeline template is selected to manage the deployment pipeline, then that live pipeline template may be used to bring the configuration of the deployment pipeline under source code control. To do so, the developer may be prompted to specialize one or more base class live pipeline templates associated with the matching live pipeline template with instance specific details used to define an LPT instance. The resulting LPT instance may be used to reconfigure the deployment pipeline using the LPT synthesis process.

Figure 18:
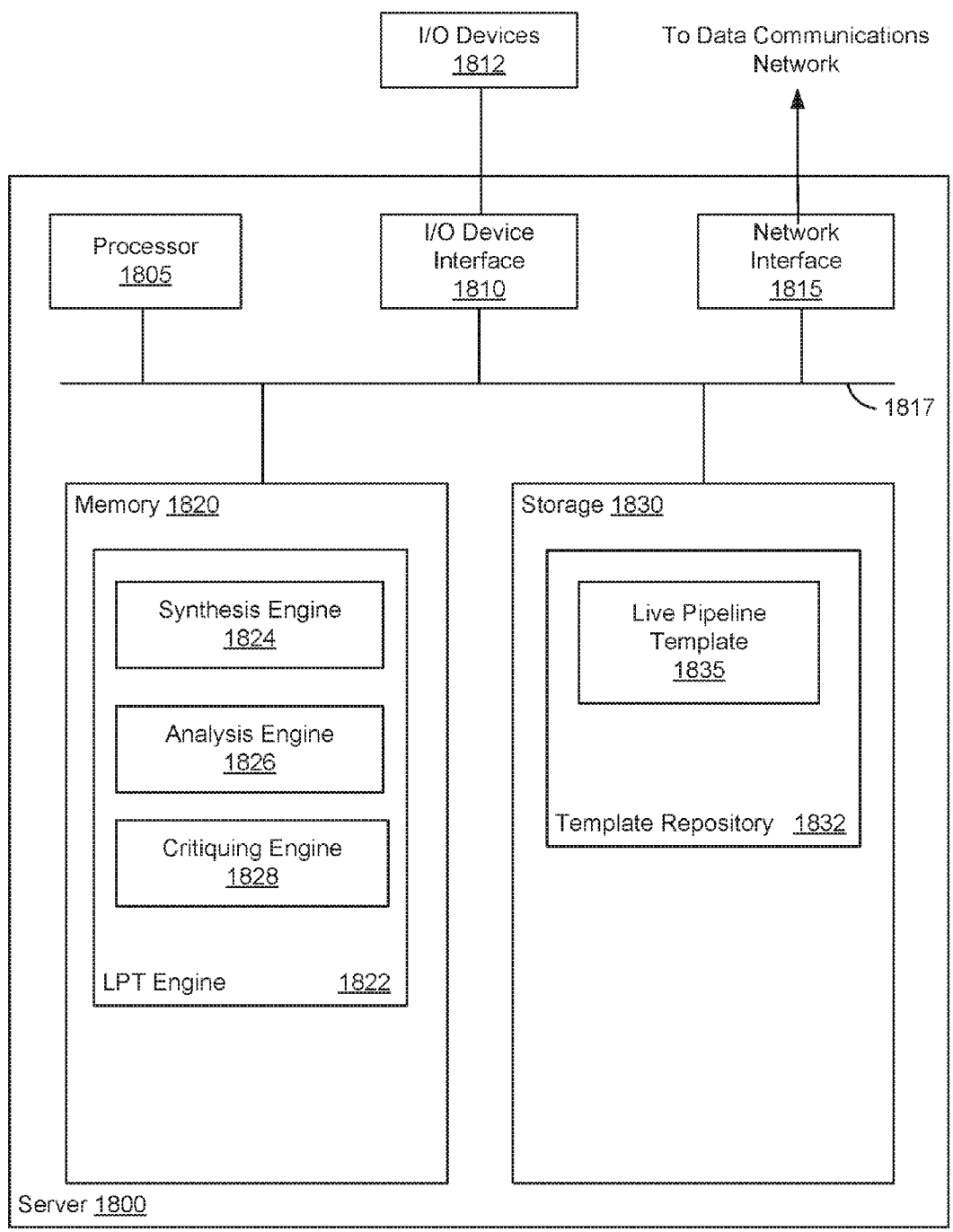
FIG. 18 illustrates an example computing system used to host components of the live pipeline template service, according to one embodiment.

FIG. 18 illustrates an example computing 1800 system used to host components of the live pipeline template service discussed herein, according to one embodiment. As shown, the computing system 1800 includes, without limitation, a central processing unit (CPU) 1805, a network interface 1815, a memory 1820, and storage 1830, each connected to a bus 1817. The computing system 1800 may also include an I/O device interface 1810 connecting I/O devices 1812 (e.g., keyboard, display and mouse devices) to the computing system 1800. In context of this disclosure, the computing elements shown in computing system 1800 may correspond to a physical computing system (e.g., a system in a data center) or may be a virtual computing instance executing within a computing cloud. Further, while shown as running on a single computing server 1800, components in memory 1820 and storage 1830 may be deployed across multiple computing servers.

The CPU 1805 retrieves programming instructions and application data stored in the memory 1820 and storage 1830. The interconnect 1817 is used to transmit programming instructions and application data between the CPU 1805, I/O devices interface 1810, storage 1830, network interface 1815, and memory 1820. Note, CPU 1805 is included to be representative of a single CPU, multiple CPUs, a single CPU having multiple processing cores, and the like, and the memory 1820 is generally included to be representative of a random access memory. The storage 1830 may be a disk drive or flash storage device. Although shown as a single unit, the storage 1830 may be a combination of fixed and/or removable storage devices, such as fixed disc drives, removable memory cards, optical storage, network attached storage (NAS), or a storage area-network (SAN).

Illustratively, the memory 1820 includes an LPT engine 1822, which itself includes an LPT synthesis engine 1824, an LPT analysis engine, 1826, and a critiquing engine 1828. And the storage 1830 contains a template repository 1832 and a collection live pipeline templates 1835. As described, the LPT synthesis engine may generally allow developers to compose a live pipeline template 1835 by specifying a relatively small amount of program source code specifying service-specific data for an instance of the LPT template. The remainder of the live pipeline template 1835 encapsulates best-practices for configuring, deploying, and maintaining an instance of the type of service corresponding to the live pipeline template. Once a developer specifies the instance specific details, the resulting source code of the LPT instance may be compiled and ran to build an application definition which describes a fully-specified configuration for a deployment pipeline built by the LPT synthesis engine 1824. For example, as described, the LPT synthesis engine 1824 may include a set of LPT synthesis drivers which each read the relevant sections of the application definition and configure a corresponding one of the leaf systems.

In the other direction, the LPT analysis engine 1826 may inspect the configuration of an in-use deployment pipeline and generate a "ground truth" application definition representing whatever configuration state is observed by the deployment configuration. Once generated, the critiquing engine 1828 may evaluate the "ground truth" application definition using a set of rules used to identify best practices or operational requirements that should be followed by the deployment pipeline.

The rules may be scoped to be enterprise wide, service-type specific, or otherwise selected to suit the needs of a particular case. In addition, the critiquing engine 1828 may compare the "ground truth" application definition with live pipeline templates 1835 in the template repository 1832. Doing so may provide a source for suggested changes to the "ground truth" application definition, used to prevent the leaf systems used in the continuous deployment pipeline from being modified directly by developers, as well as suggest one of the live pipeline template 1835 that could be used to bring a deployment pipeline being used to manage a production service under source code control of a live pipeline template.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present invention, other and further embodiments of the invention may be devised without departing from the basic scope thereof, and the scope thereof is determined by the claims that follow.

What is claimed is:

1. A system comprising:
    a memory storing one or more instructions that, when executed by one or more computer processors, cause the system to at least:
    invoke performance of a code deployment pipeline associated with one or more computing services;
    invoke performance of a meta-pipeline to update one or more portions of the code deployment pipeline, based at least in part on a change to source code of a live pipeline template (LPT), wherein the LPT is configured to specialize one or more base pipeline templates with parameters specific to the code deployment pipeline; and
    generate an application using the code deployment pipeline having the one or more updated portions.

2. The system of claim 1, wherein an application definition of the LPT provides a fully-specified configuration of the one or more computing services.

3. The system of claim 2, wherein the meta-pipeline updates the application definition based on the change to the LPT.

4. The system of claim 2, wherein the application definition is specified using a machine readable interchange format.

5. The system of claim 1, wherein the code deployment pipeline invokes a pipeline synthesis driver to configure a first of the one or more computing services based on the change to the LPT.

6. The system of claim 1, wherein the code deployment pipeline modifies a first of the one or more computing services in a cloud computing region specified in the LPT.

7. The system of claim 1, wherein the parameters associated with the code deployment pipeline includes at least one of a service name, an administrative contact, and a run-as username for one of the one or more computing services associated with the code deployment pipeline.

8. A method comprising:
    detecting a change in a live pipeline template (LPT), wherein a configuration of a deployment pipeline for a computing service is controlled based on the LPT;
    reconfiguring the deployment pipeline based at least in part on the detected change in the LPT; and
    generating an application by operation of one or more computer processors and based at least in part on the reconfigured deployment pipeline.

9. The method of claim 8, wherein reconfiguring the deployment pipeline includes:
    updating an application definition based on the detected change to the LPT, wherein the application definition provides a fully-specified configuration of the application; and
    propagating updates to the deployment pipeline according to the fully-specified configuration.

10. The method of claim 8, further comprising:
    identifying a current configuration of at least a first service included in the deployment pipeline;

determining whether the current configuration of the first service is modified as a result of the detected change in the LPT; and invoking a pipeline synthesis driver associated with the first service to configure the first service.

11. The method of claim 10, wherein the pipeline synthesis driver is at least one of a pipeline driver, a deployment driver, a host driver, a network driver, a security driver, an identity and access management driver, a performance monitor driver, and an alarm driver.

12. The method of claim 8, wherein the LPT specifies a set of configuration parameters for one or more deployment stages of the deployment pipeline.

13. The method of claim 8, wherein detecting the change to the LPT comprises:

monitoring a version control system for an updated version of the LPT committed to the version control system.

14. The method of claim 8, wherein the LPT inherits configuration data of the deployment pipeline from at least a second LPT.

15. A system, comprising:

a memory storing one or more instructions that, when executed by one or more computer processors, cause the system to at least:

configure a deployment pipeline according to a first application definition generated from a live pipeline template (LPT) instance, wherein the first application definition specifies a first configuration for a first computing service that is used in the deployment pipeline;

generate a second application definition based on a change to the LPT instance; and reconfigure the first computing service from the first configuration to a second configuration, based on the second application definition.

16. The system of claim 15, wherein the first and second application definition provide a fully-specified configuration for the first computing service.

17. The system of claim 15, wherein the LPT instance comprises source code including a plurality of pipeline templates.

18. The system of claim 17, wherein at least a first one of the pipeline templates specializes a second pipeline template with parameters for the deployment pipeline.

19. The system of claim 15, wherein the first configuration of the first computing service specified in the first application definition differs from the second configuration of the first computing service specified in the second application definition.

20. The system of claim 15, wherein the one or more instructions further cause the system to:

invoke a pipeline synthesis driver for the first computing service to reconfigure the first computing service according to the second application definition.

* * * * *